US012720136B2

(12) United States Patent
Sereday et al.

(10) Patent No.: US 12,720,136 B2
(45) **Date of Patent: *Aug. 25, 2026**

(54) MACHINE LEARNING SYSTEMS AND METHODS FOR PREDICTING END-USER CONSUMPTION OF FUTURE MULTIMEDIA TRANSMISSIONS

(71) Applicant: Gracenote, Inc., Emeryville, CA (US)

(72) Inventors: Scott John Sereday, Emeryville, CA (US); Cathy Zhuang, Emeryville, CA (US); Shufang Ban, Emeryville, CA (US); Oana Monica Dan, Emeryville, CA (US)

(73) Assignee: Gracenote, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/033,038

(22) Filed: Jan. 21, 2025

(65) Prior Publication Data

US 2025/0168431 A1 May 22, 2025

Related U.S. Application Data

(63) Continuation of application No. 18/370,792, filed on Sep. 20, 2023, now Pat. No. 12,231,706.

(Continued)

(51) Int. Cl.
*H04N 21/25* (2011.01)
*H04N 21/442* (2011.01)

(52) U.S. Cl.
CPC ..... *H04N 21/251* (2013.01); *H04N 21/44204* (2013.01)

(58) Field of Classification Search
None
See application file for complete search history.

(56) References Cited

U.S. PATENT DOCUMENTS 9,454,646 B2 9/2016 Siefert
12,231,706 B2 * 2/2025 Sereday .......... H04N 21/25883

(Continued)

OTHER PUBLICATIONS

NGBoost: Natural Gradient Boosting for Probabilistic Prediction, Tony Duan, Anand Avati, Daisy Yi Ding, Sanjay Basu, Andrew Ng, and Alejandro Schuler, Stanford ML Group, 2019, available at: https://stanfordmlgroup.github.io/projects/ngboost/.

(Continued)

*Primary Examiner* — Junior O Mendoza
(74) *Attorney, Agent, or Firm* — McDonnell Boehnen Hulbert & Berghoff LLP

(57) ABSTRACT

Methods and systems for prediction audience ratings are disclosed. A database of television (TV) viewing data may include program records for a multiplicity of existing TV programs. A system may receive a training plurality of program records from the TV viewing data, and for each program record a most similar TV program based on content characteristics may be identified. A synthetic program record may be constructed by merging features of each record and its most similar record. Audience performance metrics may be omitted from synthetic records. An aggregate of the training plurality of program records and the synthetic program records may be used to train a machine-learning (ML) model to predict audience performance metrics of the new or hypothetical TV programs not yet available for viewing and/or not yet transmitted or streamed.

20 Claims, 10 Drawing Sheets

Related U.S. Application Data

(60) Provisional application No. 63/377,280, filed on Sep. 27, 2022.

(56) References Cited

U.S. PATENT DOCUMENTS

| | | | | |
|---|---|---|---|---|
| 2014/0278914 | A1 | 9/2014 | Gurumoorthy et al. | |
| 2020/0328955 | A1 | 10/2020 | Kurzynski et al. | |
| 2021/0084375 | A1 | 3/2021 | Park et al. | |
| 2022/0070535 | A1 | 3/2022 | Ruthruff et al. | |
| 2022/0256219 | A1 | 8/2022 | Saafi | |
| 2023/0410130 | A1 * | 12/2023 | Hutchings .......... | G06Q 30/0201 |

OTHER PUBLICATIONS

NGBoost: Natural Gradient Boosting for Probabilistic Prediction, Tony Duan, Anand Avati, Daisy Yi Ding, Sanjay Basu, Andrew Ng, and Alejandro Schuler, Proceedings of the 37 th International Conference on Machine Learning, Vienna, Austria, PMLR 108, 2020.

* cited by examiner

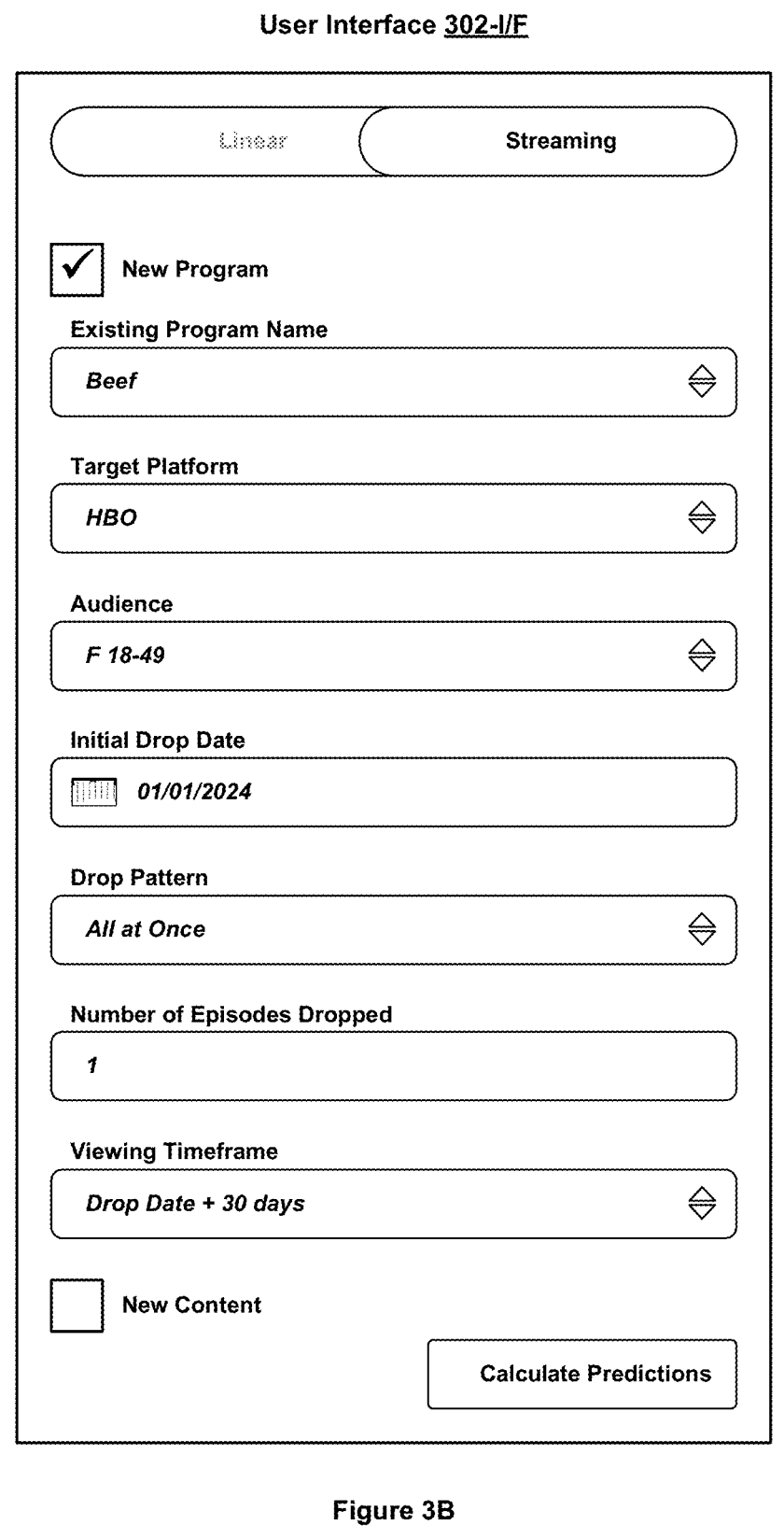

User Interface 302-I/F

Linear
Streaming

☑ New Program

Existing Program Name
*Beef*

Target Platform
*HBO*

Audience
*F 18-49*

Initial Drop Date
*01/01/2024*

Drop Pattern
*All at Once*

Number of Episodes Dropped
*1*

Viewing Timeframe
*Drop Date + 30 days*

☐ New Content

Calculate Predictions

Figure 3B

Panelist Data 202 (Per Panelist) + Network (Platform) Data 204 (Per Platform)

Real (Existing) Program Records 601

| Program ID/Title | Presentation-Logistics Features {Platform, Mode, RSDP, ...} | Program-Content Descriptor Features {Type, Genre, Mood, ...} | Other Program Features {...} | Historical Viewer Ratings Metrics {F18-49; F50-67; ...; M18-25;...} |
|---|---|---|---|---|
| *"Beef"* | *{Netflix, Stream, 09/06/2023: E1-E10, ...}* | *{Series, Dramady-γ, Frantic-λ, ...}* | *{...}* | *{6.3x10$^4$; 5.2x10$^4$;...; 5.9x10$^4$;...}* |
| ⋮ | | | | ⋮ |
| *"My Brilliant Frient"* | *{HBO, Stream, 11/18/2018: S1:E1-E2, ...}* | *{Series, Drama-α, Serious-θ, ...}* | *{...}* | *{5.7x10$^4$; 6.1x10$^4$;...; 5.2x10$^4$;...}* |
| *"My Brilliant Frient"* | *{HBO, Stream, 11/25/2018: S1:E3-E4, ...}* | *{Series, Drama-α, Serious-θ, ...}* | *{...}* | *{5.9x10$^4$; 6.3x10$^4$;...; 5.5x10$^4$;...}* |
| ⋮ | | | | ⋮ |

Synthetic Program Records 603

| Model Program / Most Similar | Presentation-Logistics Features {Platform, Mode, RSDP, ...} | Program-Content Descriptor Features {Type, Genre, Mood, ...} | Other Program Features {...} | Historical Viewer Ratings Metrics {F18-49; F50-67; ...; M18-25;...} |
|---|---|---|---|---|
| *"Beef"* | *{Netflix, Stream, 09/06/2023: E1-E10, ...}* | *{Series, Dramady-γ, Frantic-λ, ...}* | *{...}* | *{Null; Null;...; Null;...}* |
| *"Killing Eve"* | *{BBC-America, Stream, 04/08/2018: S1:E1-E8, ...}* | *{Series, Dramady-β, Pensive-σ, ...}* | | |
| ⋮ | | | | ⋮ |

Figure 6

MACHINE LEARNING SYSTEMS AND METHODS FOR PREDICTING END-USER CONSUMPTION OF FUTURE MULTIMEDIA TRANSMISSIONS

CROSS-REFERENCE TO RELATED APPLICATIONS

This application claims priority to U.S. application Ser. No. 18/370,792, filed on Sep. 20, 2023, which claims priority to U.S. Provisional Patent Application Ser. No. 63/377,280 filed on Sep. 27, 2022, the contents of both of which are hereby incorporated in their entirety herein by reference.

USAGE AND TERMINOLOGY

In this disclosure, unless otherwise specified and/or unless the particular context clearly dictates otherwise, the terms "a" or "an" mean at least one, and the term "the" means at least one.

SUMMARY

In one aspect, a system is disclosed. The system may include a database of television (TV) viewing data comprising program records for a multiplicity of existing TV programs, each program record identifying a respective TV program and including, for the respective TV program, a first set of historical presentation-logistics (PL) features, a second set of content-descriptor (CD) features, and a third set of historical viewer-rating (VR) metrics, wherein the historical PL features comprise information identifying a content-delivery platform that previously sourced the respective TV program for end-user viewing, and specifying a delivery mode used to deliver the respective TV program and a release-schedule drop pattern (RSDP) that was used by the content-delivery platform for viewing availability and/or program delivery, wherein the CD features comprise information characterizing media content of the respective TV program, and wherein the historical VR metrics comprise, for the historical PL features, statistical quantification of viewing performance of the respective TV program among one or more audience categories. The system may further include one or more processors, and memory storing instructions that, when executed by the one or more processors, cause the system to carry out various operations. The operations may include: receiving a training plurality of program records from the TV viewing data; for each given program record of at least a subset of the program records of the training plurality, identifying from among the training plurality a most similar TV program based on a quantitative comparison of CD features of the given program record with those of the other program records of the training plurality, wherein the most similar TV program is different from the respective program of the given program record; based on each given program record and its identified most similar TV program, creating a synthetic program record comprising historical PL features from the given program record, CD features of the most similar TV program, and with historical VR metrics omitted and/or replaced with null values; by applying an aggregate of the training plurality of program records and the synthetic program records as input and historical VR features of the training plurality of program records as ground-truths, training a machine-learning (ML) model to predict audience performance metrics of the respective TV programs of the training plurality of program records; and configuring the trained ML model for predicting audience performance metrics of one or more runtime program records respectively associated with hypothetical TV programs not yet available for viewing and/or not yet transmitted.

In another aspect, a method is disclosed. The method may be carried out by a computing system having access to a database of television (TV) viewing data comprising program records for a multiplicity of existing TV programs, each program record identifying a respective TV program and including, for the respective TV program, a first set of historical presentation-logistics (PL) features, a second set of content-descriptor (CD) features, and a third set of historical viewer-rating (VR) metrics, wherein the historical PL features comprise information identifying a content-delivery platform that previously sourced the respective TV program for end-user viewing, and specifying a delivery mode used to deliver the respective TV program and a release-schedule drop pattern (RSDP) that was used by the content-delivery platform for viewing availability and/or program delivery, wherein the CD features comprise information characterizing media content of the respective TV program, and wherein the historical VR metrics comprise, for the historical PL features, statistical quantification of viewing performance of the respective TV program among one or more audience categories. The method may include: receiving a training plurality of program records from the TV viewing data; for each given program record of at least a subset of the program records of the training plurality, identifying from among the training plurality a most similar TV program based on a quantitative comparison of CD features of the given program record with those of the other program records of the training plurality, wherein the most similar TV program is different from the respective program of the given program record; based on each given program record and its identified most similar TV program, creating a synthetic program record comprising historical PL features from the given program record, CD features of the most similar TV program, and with historical VR metrics omitted and/or replaced with null values; by applying an aggregate of the training plurality of program records and the synthetic program records as input and historical VR features of the training plurality of program records as ground-truths, training a machine-learning (ML) model to predict audience performance metrics of the respective TV programs of the training plurality of program records; and configuring the trained ML model for predicting audience performance metrics of one or more runtime program records respectively associated with hypothetical TV programs not yet available for viewing and/or not yet transmitted.

In still another aspect, a non-transitory computer-readable medium may store instructions thereon that, when carried out by one or more processors of a computing system, cause the computing system to carry out various operations. The computing system may include a database of television (TV) viewing data comprising program records for a multiplicity of existing TV programs, each program record identifying a respective TV program and including, for the respective TV program, a first set of historical presentation-logistics (PL) features, a second set of content-descriptor (CD) features, and a third set of historical viewer-rating (VR) metrics, wherein the historical PL features comprise information identifying a content-delivery platform that previously sourced the respective TV program for end-user viewing, and specifying a delivery mode used to deliver the respective TV program and a release-schedule drop pattern (RSDP) that was used by the content-delivery platform for viewing availability and/or program delivery, wherein the CD features comprise information characterizing media content of the respective TV program, and wherein the historical VR metrics comprise, for the historical PL features, statistical quantification of viewing performance of the respective TV program among one or more audience categories. The operations may include: receiving a training plurality of program records from the TV viewing data; for each given program record of at least a subset of the program records of the training plurality, identifying from among the training plurality a most similar TV program based on a quantitative comparison of CD features of the given program record with those of the other program records of the training plurality, wherein the most similar TV program is different from the respective program of the given program record; based on each given program record and its identified most similar TV program, creating a synthetic program record comprising historical PL features from the given program record, CD features of the most similar TV program, and with historical VR metrics omitted and/or replaced with null values; by applying an aggregate of the training plurality of program records and the synthetic program records as input and historical VR features of the training plurality of program records as ground-truths, training a machine-learning (ML) model to predict audience performance metrics of the respective TV programs of the training plurality of program records; configuring the trained ML model for predicting audience performance metrics of one or more runtime program records respectively associated with hypothetical TV programs not yet available for viewing and/or not yet transmitted; receiving a runtime simulated program record comprising an identifier of a planned and/or proposed new TV program, CD features aggregated from one or more TV programs of the TV viewing data, planned and/or proposed PL features, and with historical VR metrics omitted; applying the trained ML model to the runtime simulated program record to predict VR metrics for the new TV program; and providing the predicted VR metrics for the new TV program as output to a user interface.

BRIEF DESCRIPTION OF THE DRAWINGS

FIG. 3B depicts an example user interface of an example audience ratings prediction system, in accordance with example embodiments.

FIG. 6 illustrates an example real and synthetic program records that may be constructed from viewing data, in accordance with example embodiments.

DETAILED DESCRIPTION

I. Overview

Figure 1:
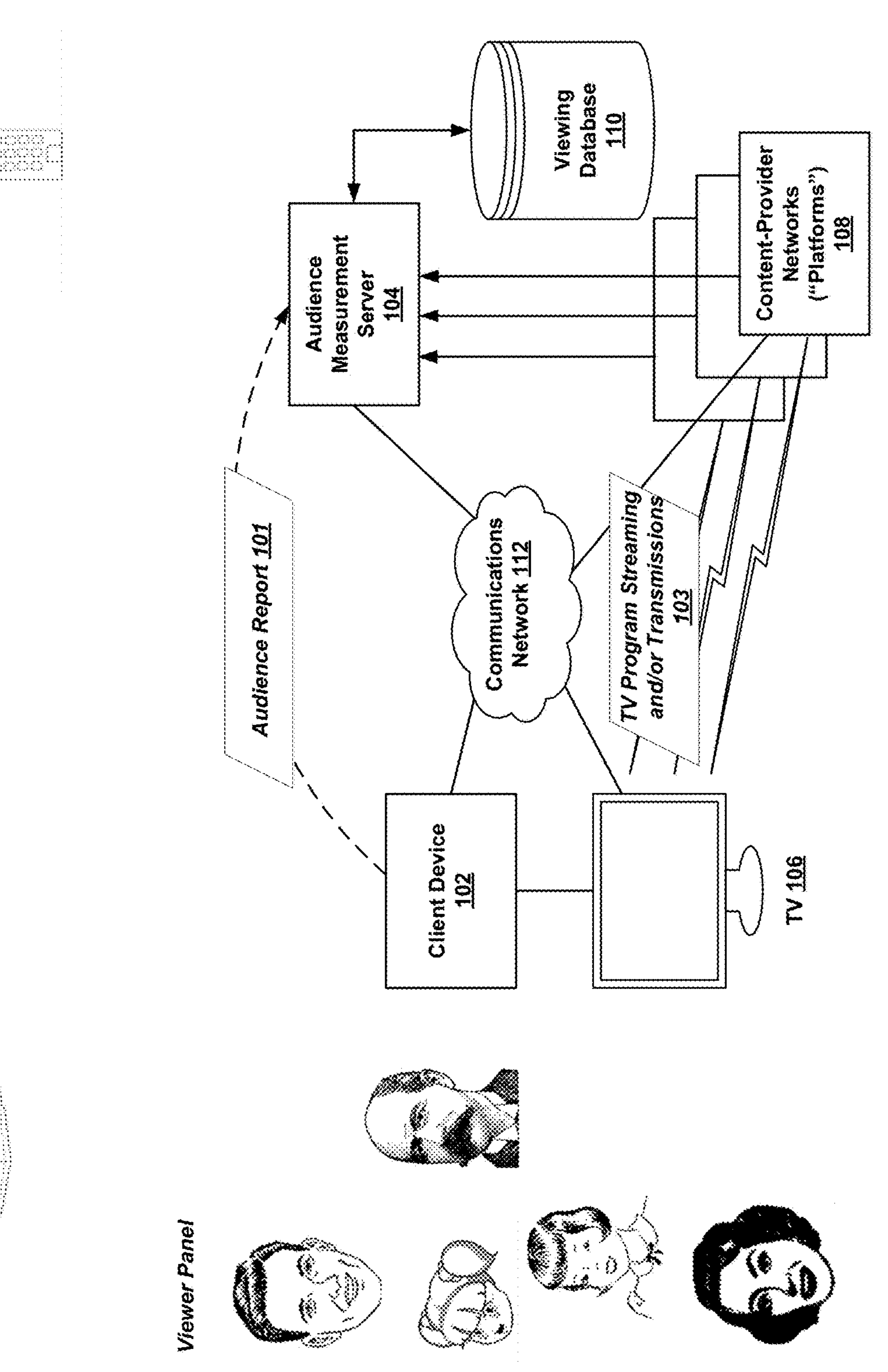
FIG. 1 is a simplified operational block diagram of an example audience measurement system in which various disclosed principles can be implemented.

Content providers may provide various forms of online streaming, broadcast, and/or downloadable media content to end-users, including video media, music and other audio media, and other possible forms of media content, for example. A content provider, also referred to herein as a "content-delivery platform" or just "platform," may be a direct source of content for end-users, or may provide content to one or more content distribution services, such as broadcasters or content-provider networks, which then deliver selected content to end-users. An example of a content provider could be a media content company that provides media content to media distribution services, which then deliver media content to end-users. End-users may subscribe at a cost to one or more media distribution services or directly to one or more media content companies for content delivery, and/or may receive at least some content at no charge, such as from over-the-air broadcasters, (at least partially free) content-provider networks, or from public internet websites that host at least some free content for delivery to end-users. Media content to end-users may be delivered as broadcast or streaming content for immediate playout and/or may be downloaded media files that may be locally stored on user devices for playout at any time, for example.

Content providers and/or media distribution services may be interested in measuring viewing, listening, and/or, other media-consumption statistics of end-users who receive content. For example, content providers and/or media distribution services may want to correlate media TV programming preferences and/or habits of users (e.g., TV viewing choices) with their demographic information, such as ages, gender identifications, professions, and educations. As another, non-limiting example, content providers and/or media distribution services may want to collect the same type of information about listeners of radio programs, or consumers of web-based content. Referred to herein as "audience measurement" information or data, such information or data may be useful for marketing, advertising, content-production planning, and/or program scheduling, among other possible uses.

Audience measurement data may include and/or be correlated with information about specific content, such as content-network provider, content type, media type, delivery mode (e.g., broadcast, streaming, etc.), and when and/or how the content was or will be delivered, among other data. By way of example, a particular content might be a TV program provided by a TV network (broadcaster). As another example, a TV program could be made available as streaming media content from a content provider upon user request. Other examples are possible as well. A TV program could be characterized by a type and/or genre, such as sports, drama, or situation comedy, for example. Other information could describe serialization, episodes, and availability for delivery or viewing thereof according to one or more schedules. Availability scheduling is sometimes referred to as "drop pattern," which may specify when a TV program and/or its episodes (if applicable) first become available and in what combination (e.g., all episodes at once, one per week, etc.). In this arrangement, a particular TV program may be made available in one or more "drops," each identifying the particular TV program and specifying a platform and a drop schedule, among other information.

Analysis of audience data, including content-specific information, may be used to measure performance of specific content among or across various categories of audience demographics, and/or with respect to delivery factors, such as drop pattern. One example of a performance metric is ratings, which may be a tracking of total amount of time (e.g., minutes) watched of a given TV program within some specified time window beginning from when the program becomes available for viewing, such as when the TV program is or was "dropped." For a TV program with more than one drop, a separate ratings measurement may be obtained for each drop, and may be further broken down according to viewer demographics, as noted.

In practice, audience measurement activities may be conducted by a third party, such as a market research company, and various results and measurements, such as ratings, may be provided as a service to content providers, content distributors, content creators, and/or advertisers, for example. As such, various audience measurement activities may be carried out by a market research company or other entity acting in the service of, or on behalf of, content providers, content distributors, content creators, and/or advertisers. For purposes of the discussion herein, the terms "audience measurement organization" and/or "ratings organization" will be used to refer to such a market research company or other entity. It should be understood there may be a variety of forms of audience measurement or ratings organizations, besides market research companies or third parties, for example, that undertake audience measurement activities. Further, it may be possible for any party interested in, and/or benefiting from, audience measurement activities and/or data, to directly carry out these activities for themselves. These considerations are not limiting with respect to example embodiments described herein.

An audience measurement organization may deploy or implement measurement/ratings system that includes components for collecting both audience measurement data from specific viewers, and content information from content providers and/or media distribution services (e.g., platforms). For purposes of discussion, and by way of example herein, TV content will be considered. More particularly, example embodiments will be described in terms of TV programs, TV networks, TV broadcasts, and video streaming. It should be understood, however, that the principles discussed are not limited to the example context, and may be extended and/or adapted to other contexts, such as more general audio and video content and formats, and other types of content providers and/or media distribution services.

Considering the example of TV programming and viewership, audience measurement may involve identifying potential TV viewers who agree to having their viewing habits, choices, and/or preferences monitored and recorded, and then collected as audience viewing statistics. A market research company (or other pertinent entity) may identify potential, willing viewers through a recruiting process, for example. Willing viewers, referred to as "panelists," may agree to provide various demographic information to the content provider and/or media distribution service, and also consent to the placement in their residence of a monitoring device that can monitor and log their TV viewing activities over time. In particular, the monitoring device may record who among a household of panelists is present during each of some or all "viewing sessions" during which the TV is on (or active), as well as what TV programming (content) is being received by and/or presented on the TV during the viewing sessions. The monitoring device may further be configured to transmit audience viewing statistics in the form of audience viewing reports, for example, to the market research company, and/or possibly to the content provider and/or media distribution service. Transmissions may be made via one or another form of communicative connection, such as an internet or other network communication connection, for example. The received audience measurement data may be organized and stored in a "viewing database," or other form of persistent storage.

A measurement/ratings system may also collect content information from one or more content providers and/or media distribution services. Considering again TV programming and viewership, one or more TV networks may provide content information to a measurement/rating system. The measurement/ratings system may then organize, correlate, and store content information with the audience measurement data in the viewing database. Various forms of analysis may then be applied to the viewing database to produce ratings and/or other forms of performance metrics, for example.

Conventional analysis of TV viewing data has focused largely on evaluation of past or historical performance. Yet there are also value and benefits in predicting or forecasting expected ratings results for future programming and/or program scheduling. For example, a TV network executive, producer, or other person may be interested or responsible for forecasting ratings of a new or planned TV program, including predicting how ratings may be expected to vary with, or be influenced by, scheduling considerations and viewer demographics, among other factors. The new or planned program may be characterized (or characterizable) according to similarities to one or more existing TV programs represented in a viewing database. Further, the executive or producer may want to evaluate predicted ratings for a variety of combinations of demographic categories, hypothetical audience sizes, and/or hypothetical drops or drop patterns.

Accordingly, example embodiments disclosed herein provide methods and systems for predicting ratings for new, planned, and/or hypothetical TV programs (or other forms of media content). As described by way of example, a ratings-predictor system and method may train a machine-learning (ML) model to predict historical ratings based on observed data in a viewing database, and may then take various selection criteria or parameters as input to apply the trained ML model to predicting ratings for the new, planned, and/or hypothetical TV programs. By invoking the trained ML model for a variety of input criteria, a corresponding variety of predicted ratings may be generated.

The systems, methods, and techniques disclosed herein are described by way of example in terms of audience measurement of TV broadcasts and/or streaming video viewing of TV programs (e.g., shows, movies, live events, etc.). However, it should be understood that principles involved may be extended to audience measurement of other forms of end-user consumption of media content and media delivery. Other non-limiting examples may include audience measurement of listening habits and choices of listeners of audio content, such as radio broadcasts, as well as audience measurement of end-user consumption of web-based content and streaming content of audio and video media data.

II. Architecture

FIG. 1 is a simplified operational block diagram of an example audience measurement system in which various disclosed principles can be implemented. As shown, the example audience measurement system 100 includes a client device 102 deployed at client-side site, such as a residence or domicile of one or more panelists, and an audience measurement server 104 and viewing database 110 deployed at server-side site, such as a managed network and/or cloud computing platform owned and/or operated by or on behalf of the content provider and/or media distribution service. The client device 102 may be considered the monitoring device discussed above, for example. The client device may be communicatively connected to a TV 106, as shown, and may also have a communicative connection with the audience server 104 by way of a communications network 112, such as an internet, for example. In some deployments, another type content presentation device, besides or in addition to, a TV 106 could be used. For example, a PC, desktop computer, or tablet, among other non-limiting examples.

Also as shown, the audience measurement server 104 may be communicatively connected with the viewing database 110. In accordance with example embodiments, the client device 102 may be configured to monitor viewing activities of panelists, and transmit anonymized audience measurement reports 101 to server 104. Various techniques and/or methods for detecting and/or determining which viewer or viewers are present and watching TV may be implemented in the client device 102. Non-limiting examples may include incorporating functionality in a TV remote control device that prompts user self-reporting input, providing a user interface (e.g., a keyboard) for user self-reporting, and a "check-in" device that communicates with the client device 102. Once viewing activity is being monitored, information about panel members present during one or more viewing sessions may be provided in the form of "name IDs" that serve as proxies or aliases for actual panelist identities. These examples of monitoring operations should not be considered as limiting with respect to example embodiments herein.

During audience measurement operations, the client device 102 may be configured to detect when the TV 106 is turned on or made active, and is, or starts, receiving TV programming streaming and/or transmissions 103 via one or another form of delivery mode. Non-limiting examples of delivery mode may include over-the-air broadcasts, cable TV broadcasts, and/or media streaming via an internet, such as communications network 112. TV programming may include scheduled broadcasts and/or on-demand streaming available from various content-provider networks (platforms) 108 according to one or another drop pattern, and content may include TV programs (e.g., TV productions, sporting events, etc.) and movies, for example. The client device 102 may also be configured to identify the specific TV programming that is being received and presented at any given time when the TV is on or active. The time during which the TV 106 is on or active and receiving and presenting media content is referred to herein as a "viewing session." There may be one or more viewing sessions over the course of any given time interval, and the client device 102 may thus detect and/or become active during any or all of the one or more viewing sessions. Times during which no TV viewing is occurring may also be considered part of audience measurement, since non-viewing times are reflective of overall viewing activities.

For purposes of discussion, a hypothetical viewer panel of five members is represented by drawings of faces on the left of FIG. 1. By way of example, the panel members are taken to be a hypothetical family of a mother, a father, two girl children, and a grandfather. The specific characterizations of the hypothetical viewer panel members serve to illustrate various aspects of example demographic information, as well as various aspects of example operation. Otherwise, the particular combination of panel members is arbitrary, as are the illustrated faces of the panel members. In accordance with example embodiments, it may be assumed that the panel members have agreed to their membership on the panel, and consented to having their viewing habits and choices reported, possibly in anonymous fashion, to the audience measurement server 104.

In further accordance with example embodiments, alias or proxy identities of the panel members present during a given viewing session may be used. At one or more times after the panel members present at a given viewing session have been determined, the client device 102 may generate an audience report 101 and transmit the report to the audience server via the communications network 112 or other communicative connection. The audience report 101 may include anonymized panel-member identity information, as well as an indication of the TV programming being received during the session.

In some operational scenarios, the client device 102 may aggregate multiple audience reports from multiple viewing sessions, and send the aggregate to the audience measurement server 104 in one transmission or message. The aggregate report of multiple viewing sessions could also be considered a single audience report containing the viewing results of multiple viewing sessions. It should be understood that there can be various ways of aggregating viewing activities from multiple sessions, all of which are non-limiting with respect to example embodiments.

The viewing database 110 may include demographic information associated with each panelist. Non-limiting examples of demographic information may include such demographic categories as age, gender, occupation, income level, ethnicity, and education level. In some examples, a panelist's consent may be obtained separately for each of one or more of the demographic categories to be obtained and recorded. Other forms of privacy safeguards may be implemented as well. Again, forms and/or modes of privacy protection should not be considered as limiting with respect to example embodiments.

As also shown in FIG. 1, one or more content-provider networks 108 may be communicatively connected with the audience measurement server 104. In the example of TV programming, the content-provider networks 108 (platforms) may be TV broadcast networks and/or video streaming services, for example, which broadcast and/or stream TV program streaming and/or transmissions 103 that may be received by TV 106. In this disclosure, the colloquial term "TV show" or just "show" is sometimes used to refer to specific TV content or TV programs transmitted and/or streamed to, and possibly received by, one or more panelists. For the example of TV show broadcasts, a panelist may be considered as receiving a show broadcast or transmitted by a particular TV network if the panelist's TV is set (e.g. "tuned") to the particular TV network during at least part the duration of the transmission, and possibly if the panelist is detected (or logged) as present. In the case of streaming content, a panelist's viewing may be determined by the panelist having requested (e.g., "on-demand") particular content.

Content-provider networks 108 may also provide the measurement system with information about their TV programming. Such information may include TV program names or other identifiers, data characterizing the TV programs (e.g., type of show, genre, serialization/episodes, associated personalities, such as cast, etc.), and broadcast/transmission scheduling (e.g., duration, time of day, day of week, etc.), drop pattern. Other types of information may be included as well. The TV programming information received at the measurement system may be organized and stored in the viewing database 110 with the audience measurement data. In another arrangement, the TV programming information may be stored in a different database or form of persistent storage. As described below, both the audience measurement data and the TV programming data may be analyzed for making ratings predictions. The viewing database is discussed in more detail below.

While the content-provider networks 108 are depicted in FIG. 1 as being connected to the audience measurement server 104, they may be connected to one or more different elements of the audience measurement system. More generally, the audience measurement system may include additional and/or different components or elements than just the ones shown in FIG. 1.

A. Audience Ratings Prediction System

Example embodiments described herein provide a mechanism to facilitate training a machine learning (ML) model to enable prediction of how well a new TV program will perform with viewers in terms of demographics (e.g., what demographics shares of people are likely to consume the program, how many minutes of the program will be consumed per demographic, what the distribution of consumption of the program will be across various different demographics, etc.), as well as other factors, including, without limitation, drop pattern/schedule, content-provider network (platform), and delivery mode.

A representative trained ML model may receive user input providing various characteristics of a new TV program that has not yet been generally released for user consumption and, therefore, which the ML model does not have actual data as to how the new media content will perform in practice. Herein, a "user" may refer to a network executive, producer, or other person interested in obtaining predictions of ratings performance of new programs, as described above, for example. In addition, the term "new program" or "new TV program" will generally refer to a program that does not even exist yet, or a new program that has not yet been released, as compared with a new episode of an already released program, for example. The trained ML model may then use user-provided characteristics to predict how the new program will perform, based on how program content with similar characteristics has performed in the past, among other factors and aspects of data for existing programs.

The inventors have recognized that effective training such a ML model is at least partially determined by what characteristics of program content that are considered as a basis for leveraging information about previously-observed program content for not-yet-observed (new) program content so that the ML model can then predict how not-yet-observed program content will perform. Since a new program will not have any historical audience information available about it (because it has not yet aired or otherwise been released), and might also differ in video characteristics from the observed program content (e.g. the cast, plot, structure, etc. will be different), the observed historical information cannot generally be leveraged as-is in order to make inferences about the new program.

Accordingly, the inventors have devised a training process that can make use of existing (e.g., historical) data of various programs, with data revised or distorted in specific ways that help to mimic what similar—but not necessarily identical—behavior and content characteristics would apply to a new (future) program release.

In accordance with example embodiments, a database, such as viewing database 110, may contain data records for each of various programs. A computing system may be configured to operate to establish groups of those programs that are similar in characteristics to each other and could train the ML model based on those groups. In further accordance with example embodiments, for each given pair of programs, the computing system could deem one of the programs to be "previously-observed" and the other program to represent a hypothetical—e.g., "not-yet-observed"—program for purposes of training the ML model to learn key characteristics that would correlate with a prediction of performance.

In so establishing these training data, the computing system may modify a selected subset of the observed data to create "synthetic" data records in a technically useful manner. For instance, the computing system may null out information that would not be available in practice for an actually new program, such as information about actual ratings that would not be known about the "non-yet-observed" program. Further, the computing system may include some conditional inputs to train based on various assumed characteristics, such as drop pattern and network, among other conditioning factors. And the computing system may also take into account content descriptors and labeling provided by user input, to facilitate identifying similar program content.

In accordance with example embodiments, training the model based on comparisons between pairs of existing program data records, with data revised as noted above for instance, may enable application of the trained ML model to predict how a not-yet-observed program will perform, while avoiding a need for a user to enter a tremendous number of data points about the new program. The trained ML model may then establish correlations and rules given the existing and revised data. In practice, a computing system may then receive from a user some key content descriptors for the new program and could apply the trained ML model to predict how that new program will perform. Further, this process may be carried out relatively quickly and respectively for many such new programs.

Figure 2:
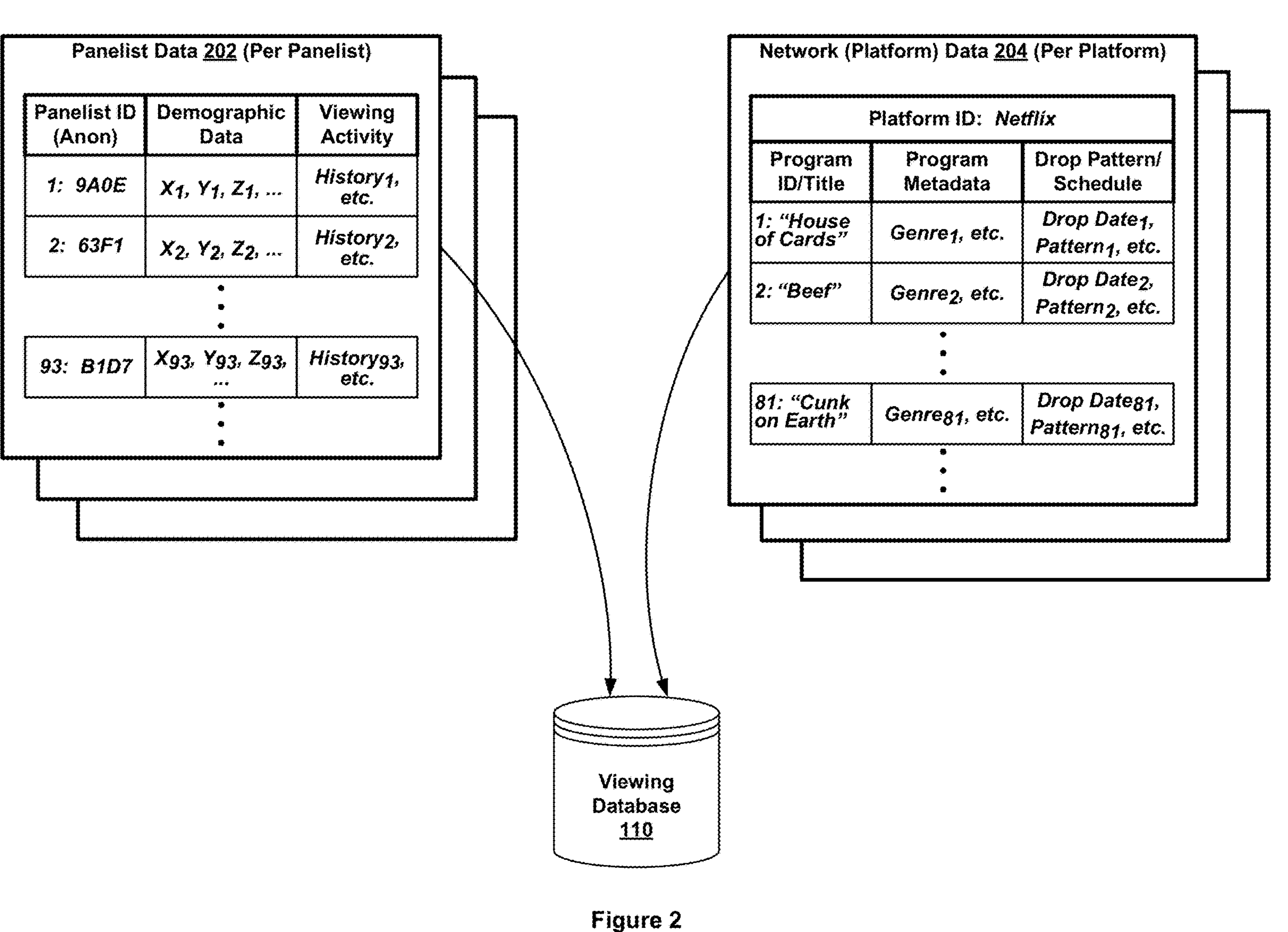
FIG. 2 illustrates an example of viewing data that may be collected, at least in part, by an audience measurement system, in accordance with example embodiments.

FIG. 2 illustrates an example data structure of viewing data 200 that may be recorded in the viewing database 110, in accordance with example embodiments. As shown the viewing data 200 may include panelist data 202, and network (platform) data 204. In accordance with example embodiments, the panelist data 202 may include a record or other data structure for each panelist. By way of example, each panelist record may include an anonymized panelist identification (ID), demographic data, and historical viewing activity measurements. In further accordance with example embodiments, the network data 204 may include a record or other data structure for each programming available by each of the content-provider networks 108, for example. Also by way of example, network data record 204 may identify a network/platform, and may include a table or list of programs. Each program may be identified by title, and include metadata descriptive of content, as well as a historical drop pattern and/or schedule of availability.

In the example illustrated in FIG. 2, panelists and their associated records are numbered (indexed) 1, 2, . . . , etc., where vertical ellipses represent additional panelist records. The panelist IDs are represented by way of example as arbitrary hexadecimal numbers, and demographic data are represented as "$X_i$, $Y_i$, $Z_i$, . . . ," where i is the index of the panelist, and X, Y, Z, etc., may signify various (with the panelist's consent) demographic categories, such as age, gender, occupation, education level, salary, and/or ethnicity, among others. Demographic information may also include, to the extent applicable, and with the panelist's consent, domicile information, such as geographic region, owner/renter, housing type, number/relation of occupants, and/or household income. Additional and/or different demographic categories are possible as well, and none of the categories is limiting with respect to example embodiments herein.

The historical viewing activity of the panelists in the panelist data 202 is designated as "$History_i$, etc.," where i is again the index of the panelist. In accordance with example embodiments, the recorded historical viewing activity for each panelist may take the form of a table or similar data structure. A panelist's view history may include dates and times that the panelist watched TV (or more generally received/consumed media content), the platforms and TV programs watched, delivery mode, and other similar aspects of viewing habits, for example. As described below, aggregating viewing activities of multiple viewers may allow empirical determination of program ratings, possibly broken down according to demographic categories, for instance. Other forms of analysis are possible as well.

For purposes of illustration, the example network data 204 in FIG. 2 depicts programming for Netflix™, listing an arbitrary selection to programming that has been available for streaming on the platform. Each program is listed with a placeholder metadata descriptor (e.g., "$Genre_1$, etc.") and a placeholder drop pattern/schedule (e.g., "Drop $Date_1$, $Pattern_1$, etc."). The genre of the show may represent various characteristics of the show that may be applied in modeling to identify similar shows and/or to serve as an indicator of characteristics of a hypothetical or planned show that is the subject of model-based predictions. In this context, the term "genre" may be taken as broadly characterizing a show—e.g., as sporting event, drama series or movie, comedy series or movie, and/or being associated with one or more particular personalities (e.g., actors, directors, etc.).

It should be appreciated that the particular arrangement of the viewing data 200, the panelist data 202, and the network data 204 has been described above by way of example, and that other arrangements may be devised and/or used. For example, the historical viewing activity data table could include different and/or additional rows. As another example, show metadata could include additional characterizing features. These are just two examples of how the viewing data 200 could possibly differ from that described above. In any case, the examples above should not be considered as limiting with respect to possible alternatives and/or with respect to applicability to example embodiments.

Figure 3A:
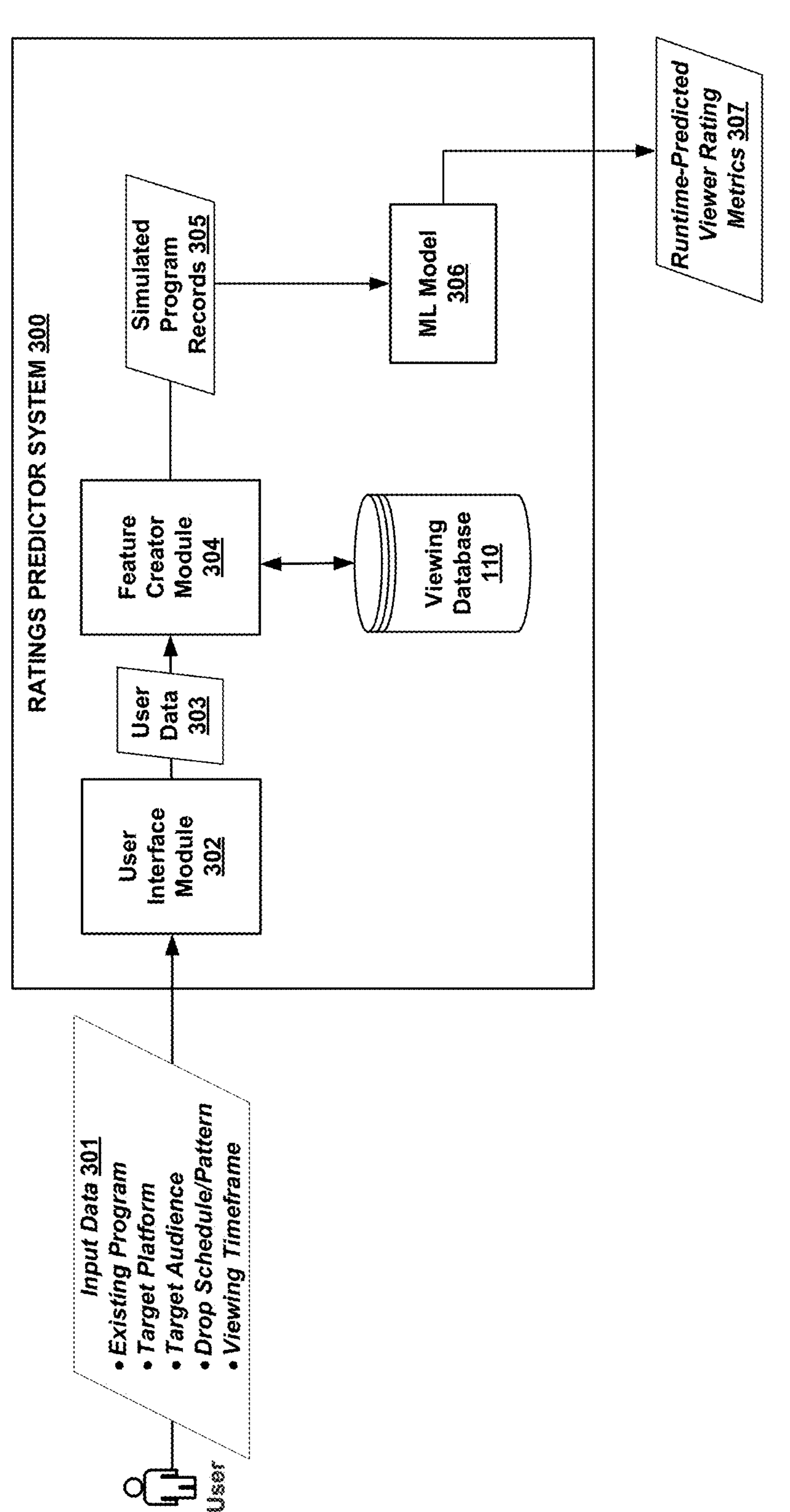
FIG. 3A is a simplified block diagram of an example audience ratings prediction system, in accordance with example embodiments.

FIG. 3A is a simplified block diagram of an example audience ratings prediction system 300, in accordance with example embodiments. As shown, the example system 300 includes a user interface module 302, a feature creator module, the viewing database 110, and a machine-learning (ML) model 306. In some configurations, the viewing database 110 may be considered separate from the system 300, though still communicatively connected to it. FIG. 3A also depicts a user and input data 301 that the user may provide via an interactive user interface 302-I/F presented by the user interface module 302, and illustrated by way of example in FIG. 3B, described below. It should be understood that an audience ratings prediction system 300 may include more, fewer, and or different components than those shown by way of example in FIG. 3A.

In an example usage scenario, a user, such as a network executive or other person interested obtaining predicted ratings for a new TV program (e.g., series, movie, etc.), may select a particular existing TV program considered to be a sort of characterizing model for the new TV program. The selection process, which is generally beyond the scope of this disclosure, may be based on a variety of subjective and/or objective factors, such as user familiarity with programming, critical reviews, among others. By way of example, the user may have determined that a characterizing model for the new TV program is "Beef," a known TV program series previously (and possibly currently) available for streaming. The user may therefore select "Beef" as input indicating an existing TV program to use by the ratings predictor system 300.

The user may also provide as input a target platform on which the new program is projected or planned to be made available, a target audience for which the predicted ratings should be made, drop schedule/pattern projected or planned to be applied to the new program, and a viewing timeframe within which to make the predicted ratings. For example, the timeframe could be a window from date of the first drop to 30 days after. In various scenarios, a user may rerun predictions for different combinations of inputs.

In accordance with example embodiments, the user interface module 302 may receive the input data 301 via the interactive user interface 302-I/F, and pass the input as user data 303 to the feature creator module 304. This may involve processing the input data 301 in one or another fashion, such as reformatting, data conversion, and so on. The feature creator module 304 may then access the viewing database to create a simulated program record 305 that represents the new program using a set of features descriptive of, and/or derived, from one or more actual, existing programs, as well as some features derived from the input data 301. The simulated program record 305 may include program content metadata of an existing program determined to be most similar to, but not the same as, the particular existing program identified in the input data 301. Additional features of the simulated program record 305 may be imported and/or derived from the particular existing program and/or other programs in the viewing database 110.

As described below, the viewing database 110 may also be used to create one or more program records for each of the existing programs in the viewing database. For example, a given program may have a corresponding program record for each of one or more drops, platforms, or combinations thereof. In accordance with example embodiments, each program record for an existing program may also include actual observed view ratings, possibly broken down according to demographic categories, for instance. Each program record may include a relatively large number of features descriptive of various aspects of the program, in addition to platform, drop schedule/pattern, content metadata, and viewer ratings. By way of example, each program record may include 100-300 features, or more. Other arrangements are possible as well. Program records may represent a subset of all data in the viewing database, and/or a particular organizational form of the viewing data. Further, program records may be created and/or generated on demand (e.g., for purposes or immediate computations) and/or stored in the viewing database 110 once created.

Within this framework—that is, "real program records" of existing programs—a simulated program record 305 may be considered a hypothetical program record representing what a real program record for a new program would look like if the new program were an actual existing program. However, a simulated program record 305 has no history of viewer rating metrics included since it represents, by definition, a program that has never or not yet been made available for viewer consumption. Rather, in accordance with example embodiments, the ratings predictor system 300, and the ML model 306 in particular, may be configured to generate predicted ratings for a new TV program based on application of a trained ML model to a simulated program record 305 of the new program. As depicted in FIG. 3A, the ratings predictions may be output by the ML model 306 as runtime-predicted viewer ratings metrics 307. The term "runtime-predicted" may distinguish the output from training predictions computed as part of ML model training, described below.

FIG. 3B depicts an example user interface 302-I/F of an example audience ratings prediction system, in accordance with example embodiments. As shown, user interface 302-I/F includes, from top to bottom, a slider bar for selecting linear delivery mode or streaming delivery mode, a "new program" checkbox to indicate a request for predictions for a new program, a pull-down menu to select a particular existing program as a characterizing model for the new program, a "target platform" for indicating a projected or planned platform, pull-down menu for selecting a demographic category, a calendar selector for selecting an initial drop date, a pull-down menu for selecting a drop pattern, a field for entering a number of episodes to be dropped, a pull-down menu for selecting a viewing timeframe, a new content check post, and a calculate predictions button to cause the system to accept the input, perform the prediction calculation, and provide the output. It will be appreciated that the user interface 302-I/F could include more, fewer, and/or different input options and/or input mechanisms. Further, the nomenclature of terms could be different.

B. Example Computing System and Cloud-Based Computing Environments

Figure 4:
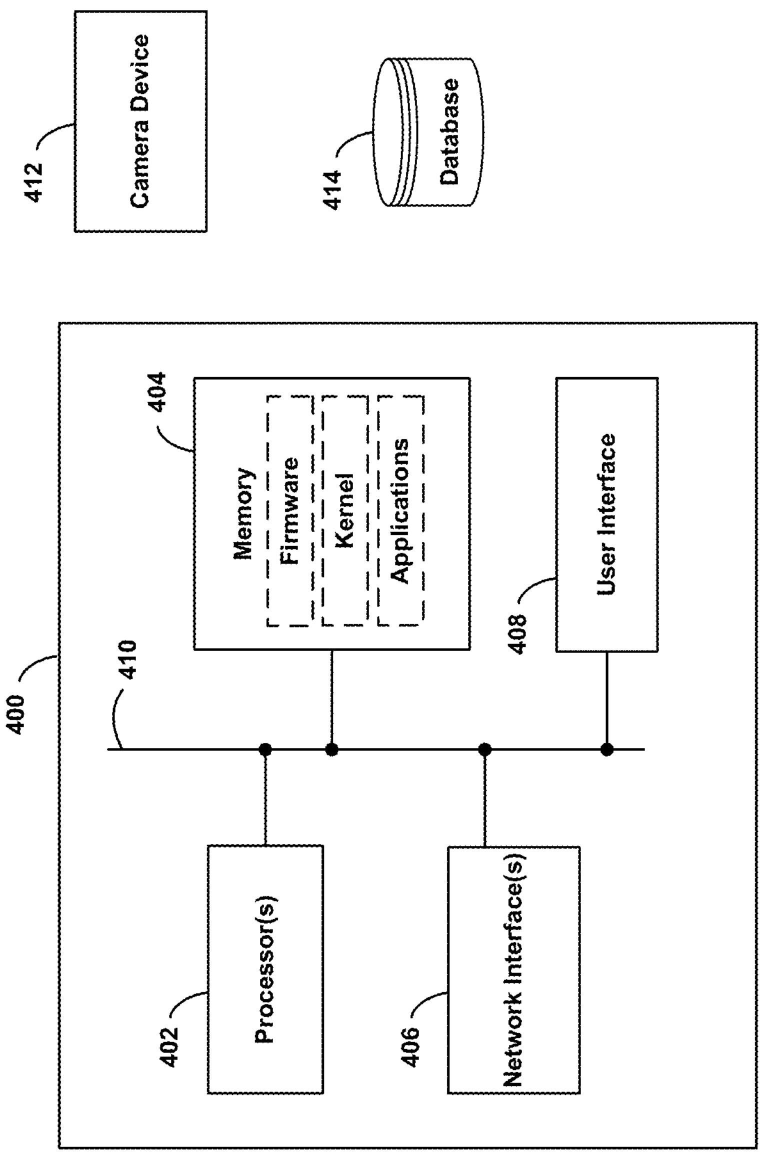
FIG. 4 illustrates a schematic drawing of a computing device, in accordance with example embodiments.

FIG. 4 is a simplified block diagram of an example computing system (or computing device) 400. The computing system 400 can be configured to perform and/or can perform one or more acts, such as the acts described in this disclosure. As shown, the computing device 400 may include processor(s) 402, memory 404, network interface(s) 406, and an input/output unit 408. By way of example, the components are communicatively connected by a bus 410. The bus could also provide power from a power supply (not shown).

Processors 402 may include one or more general purpose processors and/or one or more special purpose processors (e.g., digital signal processors (DSPs) or graphics processing units (GPUs). Processors 402 may be configured to execute computer-readable instructions that are contained in memory 404 and/or other instructions as described herein.

Memory 404 may include firmware, a kernel, and applications, among other forms and functions of memory. As described, the memory 404 may store machine-language instructions, such as programming code or non-transitory computer-readable storage media, which may be executed by the processor 402 in order to carry out operations that implement the methods, scenarios, and techniques as described herein. In some examples, memory 404 may be implemented using a single physical device (e.g., one magnetic or disc storage unit), while in other examples, memory 404 may be implemented using two or more physical devices. In some examples, memory 404 may include storage for one or more machine learning systems and/or one or more machine learning models as described herein.

In some instances, the computing system 400 can execute program instructions in response to receiving an input, such as an input received via the communication interface 406 and/or the user interface 408. The data storage unit 404 can also store other data, such as any of the data described in this disclosure.

The communication interface 406 can allow the computing system 400 to connect with and/or communicate with another entity according to one or more protocols. In one example, the communication interface 406 can be a wired interface, such as an Ethernet interface. In another example, the communication interface 406 can be a wireless interface, such as a cellular or WI-FI interface.

The user interface 408 can allow for interaction between the computing system 200 and a user of the computing system 400, if applicable. As such, the user interface 408 can include, or provide an interface connection to, input components such as a keyboard, a mouse, a touch-sensitive panel, and/or a microphone, and/or output components such as a display device (which, for example, can be combined with a touch-sensitive panel), and/or a sound speaker.

The computing system 400 can also include one or more connection mechanisms that connect various components within the computing system 400. For example, the computing system 400 can include a connection mechanism 410 that connects components of the computing system 400, as shown in FIG. 4.

Network interface(s) 406 may provide network connectivity to the computing system 400, such as to the internet or other public and/or private networks. Networks may be used to connect the computing system 400 with one or more other computing devices, such as servers or other computing systems. In an example embodiment, multiple computing systems could be communicatively connected, and example methods could be implemented in a distributed fashion.

Although not explicitly shown, the computing system 400 may also include one or more device controllers and/or interfaces for connecting to integrated and/or peripheral devices. By way of example, a camera device 412 is shown as a representative peripheral device and/or as an integrated device. Additional and/or other types of peripheral devices or components are possible as well.

In example embodiments the computing system 400 may be or include a client device, such as client device 102 discussed above. Such a client device may include an interactive display, such as a GUI. In addition to the operations discussed above and detailed below, a client device may generally be used for user access to programs, applications, and data of the computing device 400. For example, a GUI could be used for graphical interaction with programs and applications described herein.

Database 414 may include storage for input and/or output data. Thus, database 114 could correspond to the viewing database 414, for example.

In some configurations, the computing system 400 can include one or more of the above-described components and can be arranged in various ways. For example, the computer system 400 can be configured as a server, such as the audience measurement server 104, and/or a client (or perhaps a cluster of servers and/or a cluster of clients) operating in one or more server-client type arrangements, for instance.

Figure 5:
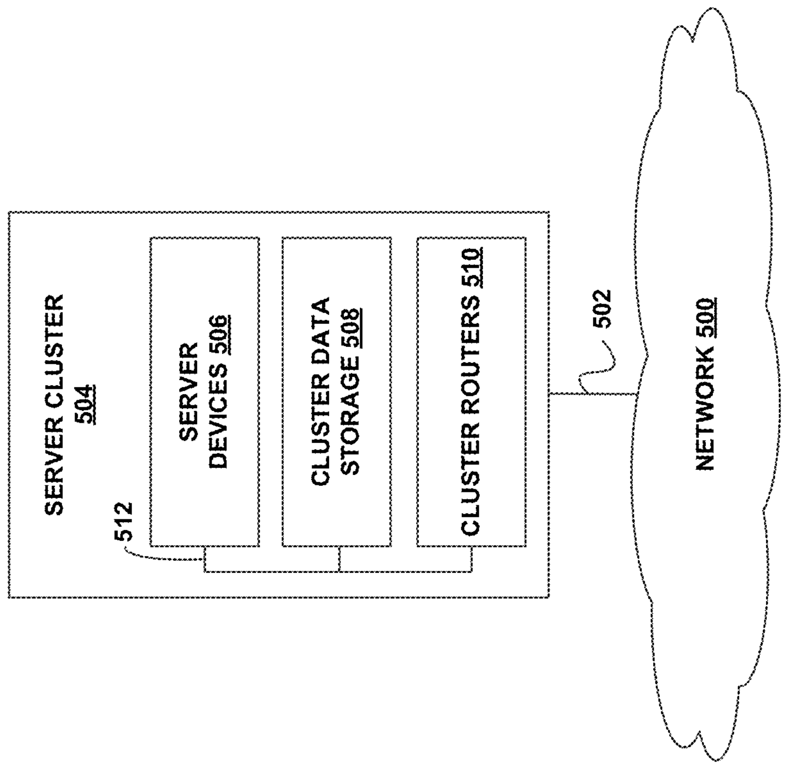
FIG. 5 illustrates a schematic drawing of a server device cluster, in accordance with example embodiments.

FIG. 5 depicts a cloud-based server cluster 500 in accordance with example embodiments. In FIG. 5, operations of a computing device (e.g., computing device 400) may be distributed between server devices 502, data storage 504, and routers 506, all of which may be connected by local cluster network 508. The number of server devices 502, data storages 504, and routers 506 in server cluster 500 may depend on the computing task(s) and/or applications assigned to server cluster 500.

For example, server devices 502 can be configured to perform various computing tasks of computing device 400. Thus, computing tasks can be distributed among one or more of server devices 502. To the extent that these computing tasks can be performed in parallel, such a distribution of tasks may reduce the total time to complete these tasks and return a result. For purposes of simplicity, both server cluster 500 and individual server devices 502 may be referred to as a "server device." This nomenclature should be understood to imply that one or more distinct server devices, data storage devices, and cluster routers may be involved in server device operations.

Data storage 504 may be data storage arrays that include array controllers configured to manage read and write access to groups of hard disk drives and/or solid state drives. The drive array controllers, alone or in conjunction with server devices 502, may also be configured to manage backup or redundant copies of the data stored in data storage 504 to protect against drive failures or other types of failures that prevent one or more of server devices 502 from accessing units of data storage 204. Other types of memory aside from drives may be used.

Routers 506 may include networking equipment configured to provide internal and external communications for server cluster 500. For example, routers 506 may include one or more packet-switching and/or routing devices (including switches and/or gateways) configured to provide (i) network communications between server devices 502 and data storage 504 via local cluster network 508, and/or (ii) network communications between server cluster 500 and other devices via communication link 510 to network 512.

Additionally, the configuration of routers 506 can be based at least in part on the data communication requirements of server devices 502 and data storage 504, the latency and throughput of the local cluster network 508, the latency, throughput, and cost of communication link 510, and/or other factors that may contribute to the cost, speed, fault-tolerance, resiliency, efficiency, and/or other design goals of the system architecture.

As a possible example, data storage 504 may include any form of database, such as a structured query language (SQL) database. Various types of data structures may store the information in such a database, including but not limited to tables, arrays, lists, trees, and tuples. Furthermore, any databases in data storage 504 may be monolithic or distributed across multiple physical devices.

Server devices 502 may be configured to transmit data to and receive data from data storage 504. This transmission and retrieval may take the form of SQL queries or other types of database queries, and the output of such queries, respectively. Additional text, images, video, and/or audio may be included as well. Furthermore, server devices 502 may organize the received data into web page or web application representations. Such a representation may take the form of a markup language, such as the hypertext markup language (HTML), the extensible markup language (XML), or some other standardized or proprietary format. Moreover, server devices 502 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Operation

Example embodiments of audience ratings prediction systems and methods may be illustrated in terms of example operation. As described above, ratings predictor system 300, as an example of an audience ratings prediction system, may include a ML model for predicting audience ratings of new programs based on model training using existing programs with known ratings. In the following discussion, example operation is illustrated by first describing training data in more detail, and then describing two example implementations of an audience ratings prediction system and associate data flow.

As discussed above, the data in viewing database 110 may be used to create one or more program records for each of the existing programs in the viewing database. Each program record may include 100-300 features, or more, relating to such program aspects as presentation logistics (e.g., platform, delivery mode, drop pattern and schedule, etc.), content characterization and descriptions (e.g., type, genre, mood, etc), and historical ratings, among others. Program records may represent a subset of all data in the viewing database, and/or a particular organizational form of the viewing data. In accordance with example embodiments, program records may be used for training ML model 306. More specifically, by training ML model 306 to predict viewer ratings metrics from a plurality of program records designated as training records, where the observed (actual) viewer ratings in the training records represent "ground truths" of training, ML model 306 may learn which and what combinations of features are most important, influential, and/or determinative of viewer ratings. Carrying out such training for a large number and variety of TV programs (or more generally, media content) may help ensure that the ML model 306 learns effectively and accurately to predict viewer ratings based on features of program records.

In further accordance with example embodiments, by including at least a portion of "synthetic program records"—constructed similarly to simulated program records described above—with real program records during training, overfitting the ML model may be avoided or prevented. At the same time the ML model may be trained to predict viewer ratings metrics for new TV programs, as described above in connection with FIGS. 3A and 3B. More particularly, overfitting may occur when a ML model is trained to reproduce observed data with high accuracy, but fails to be able to make accurate predictions for new, previously unseen data. Advantageously, including synthetic program records during training may achieve both objectives of avoiding overfitting, and learning how to make the very predictions (among possibly others) for which the audience ratings predictor system 300 is designed to generate.

The inventors have determined how to construct program records from the viewing data, and how to create synthetic records from selected program records. Synthetic records serve as hypothetical records of existing programs for which viewer ratings metrics have not yet been determined or are absent. This is achieved by omitting or nulling out historical viewer ratings metrics from the synthetic program records. The inclusion of synthetic program records with real program records during training helps the ML model learn how to predict viewer ratings metrics without necessarily having actual, observed viewer ratings metrics associated with every input training record to help the training process. However, since synthetic records are constructed from real records, the observed viewer ratings metrics of the real records are available as ground-truths, so that the accuracy of model predictions may be assessed, and the model appropriately adjusted during training.

Synthetic program records are largely the same as simulated program records applied at runtime, except that they are used as input during model training, and they do have associated viewer ratings metrics available for training purposes (though those metrics are not present in the synthetic program records as input to the model). Another difference between synthetic program records and simulated program records is that synthetic program records may be created and configured ahead of training—as can real program records used in training—and provided as input, together with real program records, in the form of an aggregate input data structure, such as a table of pre-constructed training records. In contrast, simulated program records may be created at runtime, and possibly in real time, in response to input data 301 received at the user interface 302-I/F, as described above. As such, simulated records are created based on data in the viewing database, criteria in the input data 301, and characteristics and properties of features in the data learned from the training process.

FIG. 6 illustrates an example real program records 601 and synthetic program records 603 that may be constructed from viewing data, in accordance with example embodiments. By way of example, both types of program records are shown as including three sets or categories of features or designated presentation-logistics (PL) features, program-content descriptor (CD) features, "other" program features, and a set of historical viewer ratings (VR) metrics. In addition, real program records 601 include respective program identifiers (IDs) and/or titles, and synthetic program records 603 include a "model" program ID or title together with a ID or title of a "most similar" program identified from among programs in the viewing database 110. Also by way of example, PL features are shown to include information indicating a platform, delivery mode, and release schedule drop pattern (RSDP), among other features, such as viewing timeframe, represented by ellipses; CD features are shown to include information indicating type, genre, and mood, among other features represented by ellipses. Historical VR metrics are shown to be subdivided into example demographic categories of F18-49 (i.e., female, ages 18-49), F50-67, and M18-25, with other possible categories indicated by ellipses. It should be understood that the particular features and the structural arrangement of the real and synthetic program records 601 and 603 are illustrative examples shown for purposes of the present discussion, and that more, fewer, and/or or different features and/or organizations of them may be used in any particular implementation, in accordance with example embodiments.

As an example, an illustrative real program record for the program "Beef" is represented with PL features indicating Netflix™ as the platform, streaming as the delivery mode, Sep. 6, 2023 as a drop date, and episodes 1-10 as a drop pattern. Example CD features indicate series as the type, "dramedy-γ" as the genre, and "frantic-λ" as the mood, where the notations "γ" and "λ" are introduced for illustrative purposes as arbitrary designators of modifiers or gradations of genre and mood, respectively. Also by way of example, historical VR metrics represented as total minutes watched during a specified timeframe that may also be a feature of the real program record, and the values shown are hypothetical examples. It should be understood that the values and settings of the features for this example real program record do not necessarily correspond to actual values and settings, but are shown for purposes of illustration.

Another illustrative example of a real program record is shown for the program "My Brilliant Friend." For the example, two program records are shown for two separate drops of the program. Both drops indicate HBO™ as the platform, series as the type, "drama-α" as the genre, and "serious-θ" as the mood, where again, the notations "α" and "θ" are arbitrary designators of modifiers or gradations of genre and mood, respectively. As shown, the release dates and drop patterns of the two records differ, as do the historical VR metrics (which, again, are hypothetical examples). Once more, the values and settings of the features for this example real program record are shown for purposes of illustration.

As described, synthetic program records serve during training as hypothetical records of existing programs for which viewer ratings metrics have not yet been determined or are absent. Synthetic program records are constructed to represent real records of programs deemed similar but not identical to existing programs such that, during training, the ML model can learn how to predict viewer ratings of new programs that are similar to existing ones against which it has been trained also for predicting viewer ratings. More particularly, in training against real program records, the ML model has actual historical VR metrics of most real program records available among other features that the ML model concurrently learns. In contrast, synthetic records have no historical VR metrics, so including them with real program records during training helps the ML model to learn how to predict VR metrics with a mix of (training) features that does not always include historical VR metrics.

In accordance with example embodiments, a given synthetic record may be constructed by treating a particular real program as a model program (where the term "model" here is not to be confused with that in "ML model"), and identifying another, different real program as being "most similar" according to a quantitative comparison of content descriptor features or metadata of the model program with those of other real, but different, programs in the viewing database 110. For example, by representing the CD features of each existing program as a "CD vector," a cosine distance between the CD vector of the model program and those of each of the other programs may be computed, and a program with a minimum distance identified as the most similar program. In practice, a minimum difference threshold distance may also be applied to ensure that the minimum cosine distance does not pick out the identical model program. This could happen, for example, if the two or more program records have the same program, but with very slightly different CD features. Imposing a minimum difference in distance may help ensure that the identified most similar program is different from a model program. For convenience in the present discussion, a model program and the identified most similar program may be referred to as a "program pair," and their corresponding program records may be referred to as a "program record pair."

With a program pair and program record pair identified, selected features from both records of the pair may be merged into a new record created as the synthetic record. In addition to merging selected features from both records, the values of the historical VR metrics in the newly-created synthetic record are omitted or nulled out. In accordance with example embodiments, the synthetic record may include PL features from the model record and CD features from the most similar program record. Other features of the synthetic record may include a mix of other features of both records.

Synthetic records 603 in FIG. 6 shows a hypothetical example of a synthetic record for a program deemed (hypothetically) to be similar to the program "Beef." As shown, the model program is identified as "Beef" and the most similar program—assumed in this example to have been determined according a cosine-distance computation or similar analysis—is identified as "Killing Eve." For the synthetic record, the PL features are those of "Beef," as taken from the real program record for "Beef" as illustrated in the real program records 610. In this example, the PL features from the program record for "Killing Eve" are displayed in gray font to illustrate that these PL features from the most similar record are not used in the synthetic record. Conversely, the CD features from the program record for "Killing Eve" are included as the CD features of the synthetic record, while the CD features from the program record for "Beef" are displayed in gray font to illustrate that these CD features are not used in the synthetic record. By way of example, the CD features of the synthetic record indicate series as the type, "drama-β" as the genre, and "pensive-σ" as the mood, where once more, the notations "β" and "σ" are arbitrary designators of modifiers or gradations of genre and mood, respectively. The historical VR metrics of the synthetic program record as all nulled out, as described above. As would be generally understood, "nulling out" a variable or value of a variable may correspond to setting or providing an indication that a value for the variable is unknown, undefined, omitted, or unavailable, for example.

In preparing training data for training the ML model, a plurality of real program records may be constructed from the viewing data, each having a form in accordance with the examples illustrated above, or something functionally similar, if not the same. These records may then be referred to as training real program records, or just training program records. Further, another plurality of synthetic program records may be constructed from some or all of the training program records, or possibly from real program records that are not part of the plurality of training program records. The training program records may then be aggregated with the synthetic program records to form input training data. The aggregate may take the form of a table, where each row is a program record (real or synthetic) and each column is a feature. In an example embodiment, the synthetic records may be arranged to follow the real program records in the table. The input training data may then be provided to the ML model for training, as described below.

Figure 7:
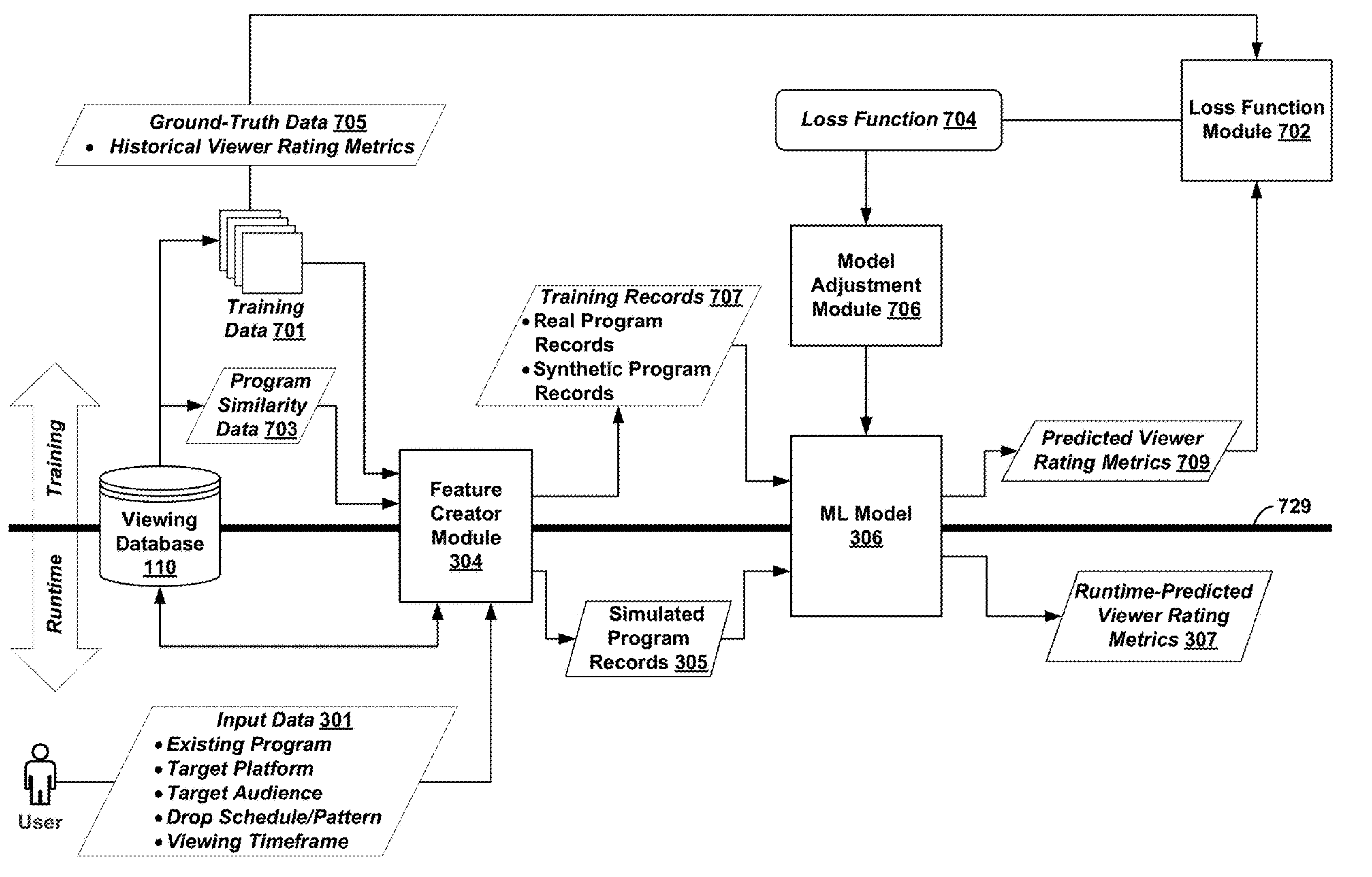
FIG. 7 illustrates example training operation and runtime operation of a machine-learning-model based audience ratings prediction system, in accordance with example embodiments.

FIG. 7 next illustrates example training operation and runtime operation of a machine-learning-model based audience ratings prediction system, in accordance with example embodiments. In the figure, a thick black horizontal line 729 divides a portion of the figure above that depicts training, and a portion below that depicts runtime operation. As shown, the system includes viewing database 110, feature creator module 304, and ML model 306, all of which are common to both training and runtime operation. In addition, the system includes loss function module 702 and model adjustment module 706 for training operation. It should be understood that the system configuration is represented in terms of these modules by way of example, and for convenience of illustrating particular concepts and aspects of operation. For example, the loss function module 702 and model adjustment module 706 need not necessarily be implemented as distinct modules or functions as shown in any given instance. But their inclusion in FIG. 7 at least identifies the roles that loss function and model adjustment play in training.

In accordance with example embodiments, at training, training data 701 and program similarity data 703 may be provided as input to the feature creator module 304, as shown. Training data 701 may include a subset of viewing data designated for training, and take the form of real program records 601, for example, and program similarity data 703 may be information that identifies, or aids in the identification of, pairs of model and similar programs and/or pairs of model and similar program records, described above, for example. In some examples, program similarity data 703 may include or be based on cosine distance analyses performed as a preliminary operation. In some examples, training data 701 may not be real program records 601, but may include program data and information for constructing real program records 601.

Still during training, feature creator module 304 may create training records 707 from the input training data 701 and 703. Training records 707 may be or include real program records 601 and synthetic program records 603. In some examples, where the training data 701 is or includes real program records 601, feature creator module 304 may construct synthetic records 603 by merging features from model and similar record pairs, as described above.

A further possible operation of feature creator module 304 may involve culling or paring down the features of each real and synthetic program record according to a feature selection operation and/or feature list that may be predefined and/or learned during training. This operation may address usage scenarios in which real and synthetic records include one or more features that are known, either preemptively or via training, to have little or no impact on training and/or the ability of the ML model 306 to predict ratings, and/or on the accuracy of predicted ratings. Such features, if included in training and/or runtime operations, may negatively affect operational performance (e.g., by consuming memory and/or computational resources) without adding compensatory benefit or advantage to the results. In practice, for example, real and/or synthetic records as constructed may include 100-300 or more features, where only a much smaller number—e.g., ~50—impact, or are needed for, effective model training for accurate predictions. Thus, feature creator module 304 may further process real and synthetic records to eliminate all but the ~50 features (for example) identified and/or known to be relevant and/or important to training and runtime operations.

Training records 707 may then be input to the ML model 306, which computes predicted viewer rating metrics 709, as indicated. In accordance with example embodiments, training records 707 may be provided in the form of a table of records, where each table row is a real or synthetic program record and each column is one of the features retained by the feature selection operation (if employed). In addition, the table may be configured such that synthetic program records follow real program records (e.g., at the bottom of the table).

Still during training, the predicted viewer rating metrics 709 are input to the loss function module 702, which also receives ground-truth data 705 derived from the training data 701, as shown. In accordance with example embodiments, ground-truth data 705 may be or include historical VR metrics of the training real program records of the training records 707, and may also include the historical VR metrics of the most similar program records used in creating the synthetic records. That is, even though the historical VR metrics of the synthetic records are omitted or nulled, there are still historical VR metrics associated with the similar program records used in synthetic record construction. These historical VR metrics may be input to the loss function module to help assess the predicted ratings of the synthetic records during training.

The loss function module 702 may then compute a loss function 704 by comparing the predicted view rating metrics 709 with the ground-truth data 705, for example. The loss function 704 may be input to the model adjustment module 706, which may then adjust the ML model to improve the predictions. This may be an iterative process, or involve another form model of adjustment algorithm. It should be appreciated that the apparent "loop" around ML model 306, predicted viewer rating metrics 709, loss function module 702, loss function 704 and model adjustment module 706 may be considered a conceptual illustration of model training and adjustment. An actual implementation might employ a different arrangement.

Once the ML model is trained, the audience rating prediction system may be used as runtime to generate rating predictions for new TV programs (or other media content), possibly in real time. More particularly, at runtime, a user may enter input data 301 via a user interface 302-I/F and user interface module 302 (not reproduced in FIG. 7). The input data 301 may identify an existing program that the user considers similar to a new program for which the user seeks ratings predictions. The input data 301 may also identify a target platform that will drop the new program, a target audience for which the ratings predictions are sought, a drop schedule/pattern for the new program, and a viewing timeframe within which to make the predictions. Other input information may be included as well, such as delivery mode.

In accordance with example embodiments, the input data 301 may be provided to the feature creator module 304, which may then construct a simulated program record 305. A simulated program record 305 may be largely similar to a synthetic program record, in that it may be constructed from an existing program record that is most similar to a program record of program identified in the input data 301, which serves the role of the model program as defined for synthetic records. Thus, a simulated program record 305 imports the CD features of a most similar record to a model program record, but uses PL features supplied in the input data 301 instead of those of the model program record. The VR metrics of a simulated program record 305 are also nulled out or omitted. In creating a simulated program record, the feature creator module 304 may access the viewing database 110 in order to retrieve relevant program data, and possible program records.

Once a simulated program record 305 is constructed, it may be input to the trained ML model, which then generates runtime-predicted viewer rating metrics for the new program, conditioned according to PL features derived from input data 301. In accordance with example embodiments, runtime operation of an audience ratings prediction system may be carried out in real time, such that a user may input data and receive nearly immediate results. In addition, simulated program records 305 may be created in real time by accessing the viewing database 110, as indicated. This may differ from real program records 601 and synthetic program records 603, which may be constructed and possibly stored ahead of training operations.

By invoking runtime operations repeatedly, a user may obtain predicted audience ratings for numerous new and/or planned TV programs, and for multiple configurations of platform, drop schedule/pattern, target audience, and viewing timeframe, among other possible input data. Prediction results may be presented to a user in various formats, such as on a display of the prediction system, stored as data, and/or printed as hardcopy.

FIG. 7 may be considered an example implementation that is "agnostic" to any particular type or algorithm of ML model. For example, an audience ratings prediction system according to FIG. 7 may employ a deep neural network for a ML model, and training may involve back-propagation. Other forms of ML model may be used as well.

Figure 8:
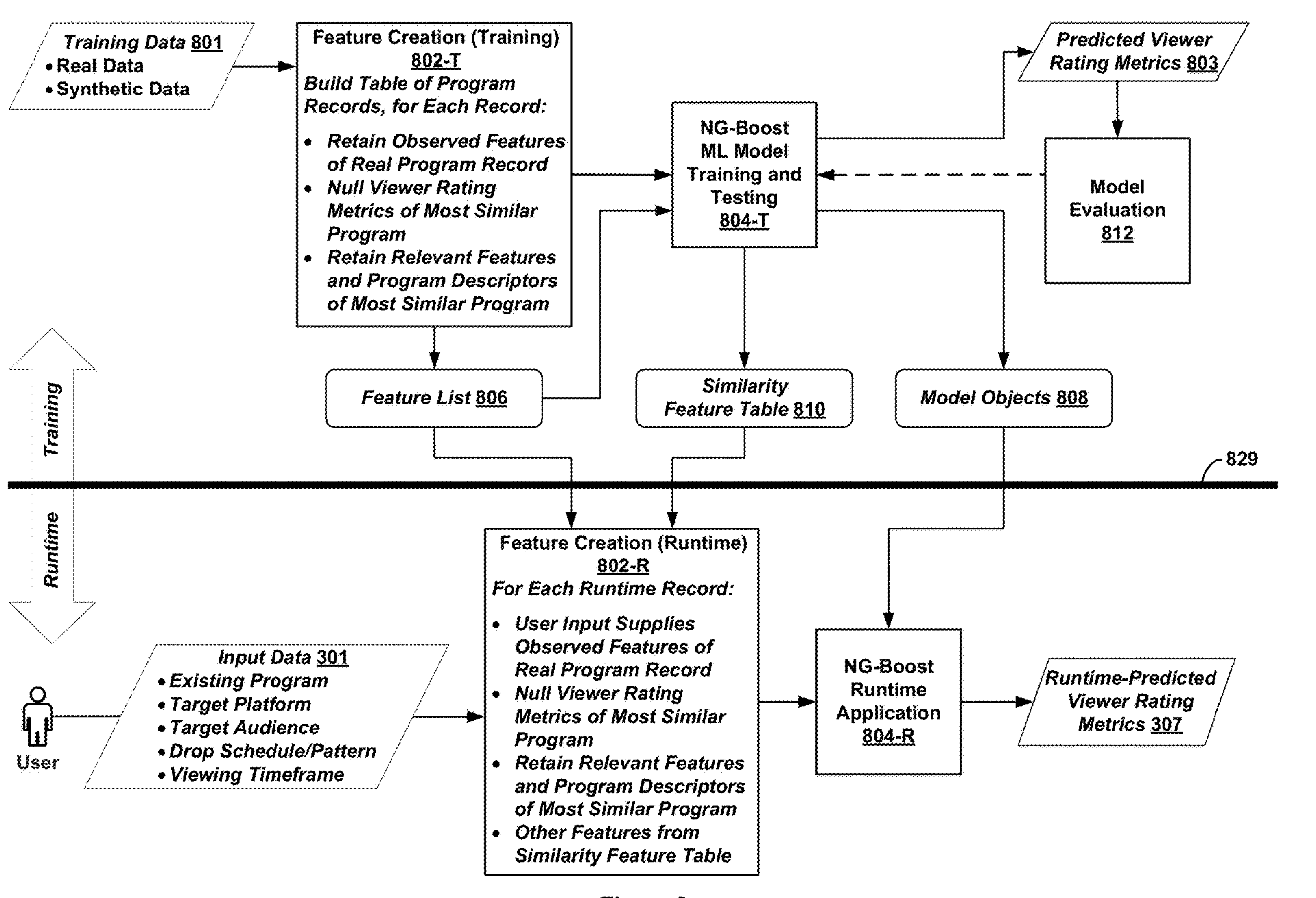
FIG. 8 is an example NG-Boost implementation and data flow of an example audience ratings prediction system, in accordance with example embodiments.

As one particular example, FIG. 8 illustrates an example NG-Boost implementation and data flow of an example audience ratings prediction system, in accordance with example embodiments. As is known, NG-Boost, is an analytical model for computing probabilistic prediction with a natural gradient boost (hence "NG-Boost) in model fitting. A description of NG-Boost may be found at https://stanfordmlgroup.github.io/projects/ngboost/, which also provides a link from which code for the model may be obtained.

In FIG. 8, the blocks represent operations and/or data, and the arrows represent data flow between operations. As in FIG. 7, a line 829 separates training operation from runtime operation.

In accordance with example embodiments, during training operation, training data 801, including real data and synthetic data, is input to a feature creator 802-T, where the appended "T" indicates training. Feature creation 802-T may build a table of program records, including real program records 601 and synthetic program record 603. The table may be the same or largely similar to that described in connection with FIG. 7. Feature creation 802-T may also generate a feature list 806, which may be used to select a subset of the total features, as described above. The table of real and synthetic records may then be input, together with the feature list 806, to the NG-Boost model 804-T within an operational context of training and testing. The feature list 806 allows the model to train only on those features in the list.

The output of the NG-Boost model 804-T may be predicted viewer rating metrics 803, which may be used in a model evaluation operation 812. Model evaluation may entail applying the trained model to one or more real program records that were not included in the training data. This enables evaluating whether the model has been overfit, for example. The dashed arrow from model evaluation to NG-Boost model 804-T indicates the additional and/or retraining is needed, for example if overfitting has been observed.

Other outputs of training include model objects 808 and similarity feature table 810. Model objects 808 may be considered as encoding the results of model training in a parameterized form, such that runtime operation and resulting predictions may be obtained by applying the model objects 808 to runtime data, as described below. Similarity feature table 810 provides similarities of records learned during training that may then be used in feature creation in runtime operations, as also described below.

At runtime, input data 301 may be received from a user, as described above, and input to feature creation 802-R (where the appended "R" indicates runtime), which may also receive feature list 806 and similarity feature table 810, as shown. Feature recreation 804-R may then create one or more simulated program records, which are input to an NG-Boost runtime application 804-R. In accordance with example embodiments, this operation may involve applying the model objects 808 from training to the simulated program record(s). The output of the model is then the runtime-predicted view rating metrics for the new program.

It will be appreciated that the arrangement of operations and data flow in FIG. 8 are shown by way of example, and other implementations using NG-Boost are possible.

IV. Example Method

Figure 9:
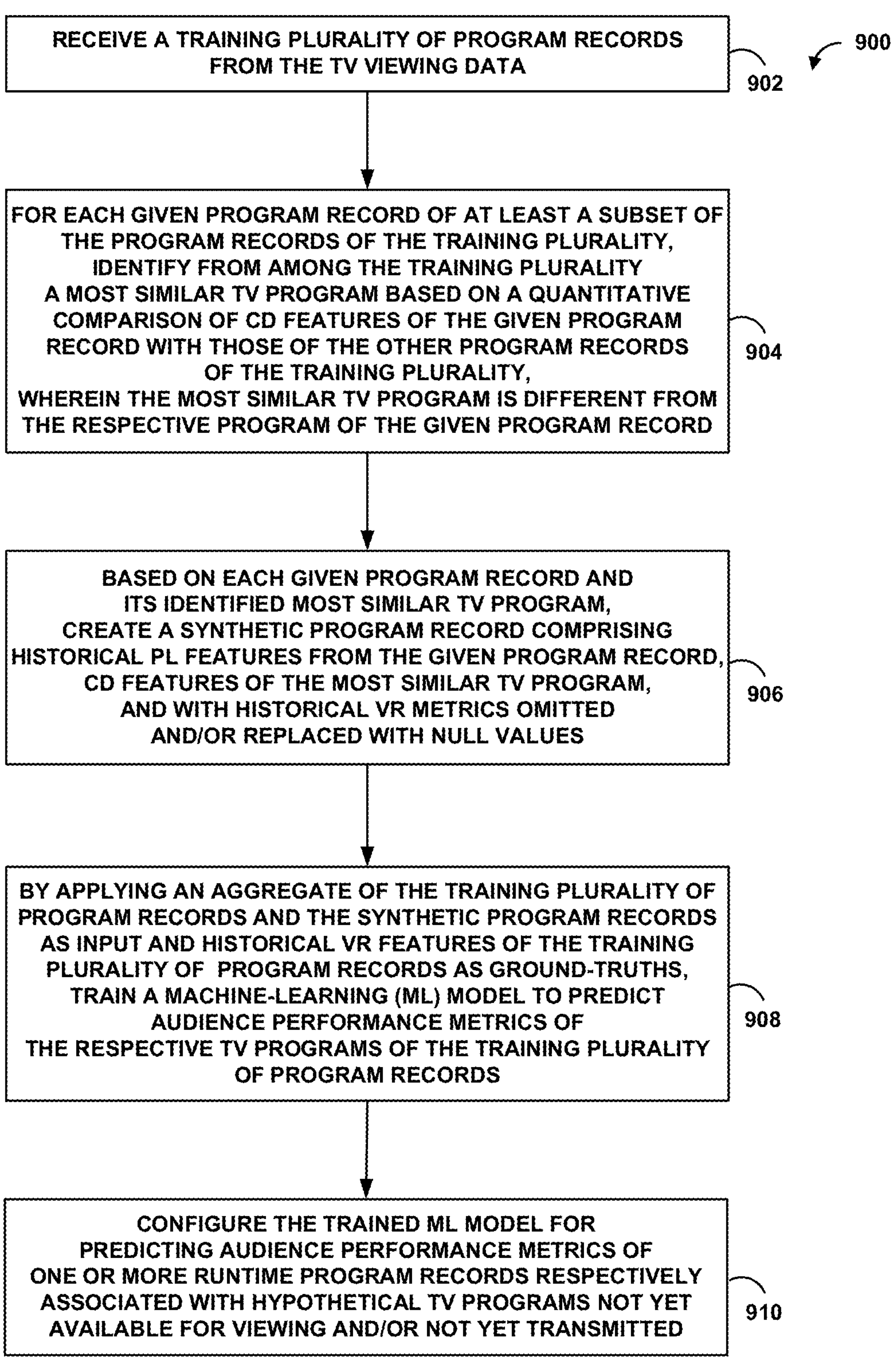
FIG. 9 is an example flow chart of an example method of audience ratings prediction, in accordance with example embodiments.

In accordance with example embodiments, operations and procedures of an example audience ratings prediction system, described by way of example above, may be implemented as methods on one or more computer devices or systems, such as those illustrated in FIGS. 4 and 5. FIG. 9 illustrates a flow chart of an example method 900 for audience ratings prediction, such as those described above, for example. Method 900 may be made operational as parts or components of an audience ratings prediction system, such as audience ratings prediction system 300, for example. The method may be carried out by one or more computing devices or systems, such as those illustrated in FIGS. 4 and 5, for example. Additionally, the method may be implemented as computer-readable instructions stored in one or another form of memory (such as volatile or nonvolatile memory) of one or more computing devices or systems. When executed by one or more processors of the one or more computing devices or systems, the instructions may cause the one or more computing devices or systems to carry out operations of the example method 900. The computer-readable instructions may additionally be stored on a non-transitory computer readable medium, which may be used, for example, for distribution to one or more computing devices or systems, and/or for loading the instructions into the memory of the one or more computing devices or systems. In some examples, the non-transitory computer-readable medium could be the memory of one or more computing devices or systems.

In accordance with example embodiments, method 900 for audience ratings prediction may be implemented in a system, such as the audience ratings prediction system 300. The system may include a database of television (TV) viewing data comprising program records for a multiplicity of existing TV programs, each program record identifying a respective TV program and including, for the respective TV program, a first set of historical presentation-logistics (PL) features, a second set of content-descriptor (CD) features, and a third set of historical viewer-rating (VR) metrics, wherein the historical PL features comprise information identifying a content-delivery platform that previously sourced the respective TV program for end-user viewing, and specifying a delivery mode used to deliver the respective TV program and a release-schedule drop pattern (RSDP) that was used by the content-delivery platform for viewing availability and/or program delivery, wherein the CD features comprise information characterizing media content of the respective TV program, and wherein the historical VR metrics comprise, for the historical PL features, statistical quantification of viewing performance of the respective TV program among one or more audience categories.

Block 902 may involve the system receiving a training plurality of program records from the TV viewing data.

Block 904 may involve, for each given program record of at least a subset of the program records of the training plurality, identifying from among the training plurality a most similar TV program based on a quantitative comparison of CD features of the given program record with those of the other program records of the training plurality. The most similar TV program may be different from the respective program of the given program record.

Block 906 may involve, based on each given program record and its identified most similar TV program, creating a synthetic program record comprising historical PL features from the given program record, CD features of the most similar TV program, and with historical VR metrics omitted and/or replaced with null values.

Block 908 may involve, by applying an aggregate of the training plurality of program records and the synthetic program records as input and historical VR features of the training plurality of program records as ground-truths, training a machine-learning (ML) model to predict audience performance metrics of the respective TV programs of the training plurality of program records.

Finally, block 910 may involve configuring the trained ML model for predicting audience performance metrics of one or more runtime program records respectively associated with hypothetical TV programs not yet available for viewing and/or not yet transmitted.

In accordance with example embodiments, method 900 may further entail receiving a runtime simulated program record comprising an identifier of a planned and/or proposed new TV program, CD features aggregated from one or more TV programs of the TV viewing data, planned and/or proposed PL features, and with historical VR metrics omitted, and applying the trained ML model to the runtime simulated program record to predict VR metrics for the new TV program. The predicted VR metrics for the new TV program may then be presented or delivered as output to a user interface.

In accordance with example embodiments, the method may still further involve additional operations prior to receiving a runtime simulated program record. Specifically, these additional operations may include, at the user interface, receiving user input including data corresponding to: (i) the identifier of a planned and/or proposed new TV program, (ii) an identifier of an existing TV program in the TV viewing data, and (iii) prospective PL data comprising a planned and/or proposed content-delivery platform and a planned and/or proposed delivery mode and RSDP for projected use by the planned and/or proposed content-delivery platform for the planned and/or proposed new TV program. The additional operations may also include identifying a runtime most similar TV program to the existing TV program based on a quantitative comparison of CD features of the existing TV program with those of the other TV programs in the TV viewing data, creating the runtime simulated program record comprising the planned and/or proposed PL features derived from the prospective PL data, and with the VR metrics omitted and/or set to null values and aggregating the CD features from the runtime most similar TV program into the runtime simulated program record.

In accordance with example embodiments, the historical PL features may further include historically-applied ratings-prediction conditioning data, including viewer demographics and viewing timeline windows within which historical VR metrics were determined. Additionally, the prospective PL data may further include prospective ratings-prediction conditioning data, including prospective viewer demographics and viewing timeline windows within which VR metrics are to be predicted by the trained ML model.

In accordance with example embodiments, the method may further include: prior to training the ML model, determining a priority subset of total features of all available features of each program record that are priority features for use in model predictions, where training the ML model further involves using the priority subset to cause training of the ML model to use only the priority features of the aggregate of the training plurality of program records and the synthetic program records. Then, applying the trained ML model to the runtime simulated program record may involve using the priority subset to cause the trained ML model to be applied only to the priority features of the simulated program record.

In accordance with example embodiments, the delivery mode of any given TV program may be linear, where availability for viewing corresponds to broadcast transmission of the any given TV program, and/or streaming, where availability for viewing corresponds to available for streaming upon viewer request. In this arrangement, the RSDP for any given TV program may specify a drop date when the any given TV program became (or will become) available for viewing, a number of episodes of the any given TV program that became (or will become) available for viewing at the drop date, or a schedule of availability of episodes of the any given TV program beginning at the drop date.

In accordance with example embodiments, the method may further involve receiving a runtime modified program record comprising an existing program record having historical PL features replaced with runtime PL features provided as user input via a user interface, and applying the trained ML model to the runtime modified program record to predict VR metrics for the TV program identified in the existing program record. The predicted VR metrics for the TV program identified in the existing program record may be presented as output to a user interface.

In accordance with example embodiments, the ML model may be a natural gradient boost (NG-boost) algorithm. In this arrangement, training the ML model may involve generating model objects, and configuring the trained ML model for predicting audience performance metrics of one or more runtime program records may involve providing the model objects for application to the one or more runtime program records.

In accordance with example embodiments, the method may further involve aggregating the training plurality of program records and the synthetic program records into an input data table, where each row includes program records, and each column corresponds to a feature of the program records, and where the synthetic records are appended as rows at the end of the input data table.

In accordance with example embodiments, statistical quantification of viewing performance of the respective program among one or more audience categories may correspond to a total number of minutes of the respective TV program watched, aggregated for each of one or more viewer demographics.

V. Example Variations

Although the examples and features described above have been described in connection with specific entities and specific operations, in practice, there are likely to be many instances of these entities and many instances of these operations being performed, perhaps contemporaneously or simultaneously, on a large scale.

In addition, although some of the acts described in this disclosure have been described as being performed by a particular entity, the acts can be performed by any entity, such as those entities described in this disclosure. Further, although the acts have been recited in a particular order, the acts need not be performed in the order recited. However, in some instances, it can be desired to perform the acts in the order recited. Further, each of the acts can be performed responsive to one or more of the other acts. Also, not all of the acts need to be performed to achieve one or more of the benefits provided by the disclosed features, and therefore not all of the acts are required.

And although certain variations have been described in connection with one or more examples of this disclosure, these variations can also be applied to some or all of the other examples of this disclosure as well.

Also, although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A system comprising:

a database comprising program records each identifying a television (TV) program and including historical presentation-logistics (PL) features, content-descriptor (CD) features, and historical viewer-rating (VR) metrics, wherein the historical PL features comprise information identifying a content-delivery platform that previously sourced the TV program for end-user viewing and specifying a delivery mode used to deliver the TV program, and a release-schedule drop pattern (RSDP) that was used by the content-delivery platform for viewing availability and/or delivery, wherein the CD features characterize the TV program, and wherein the historical VR metrics comprise, for the historical PL features, statistical quantification of viewing performance of the TV program among one or more audience categories;

one or more processors; and memory storing instructions that, when executed by the one or more processors, cause the system to carry out operations including:

for each of the program records, identifying from among the program records a most similar TV program based on a quantitative comparison of the CD features of the program record with those of the other program records, wherein the most similar TV program is different from the program of the program record;

for each of the program records, creating a synthetic program record comprising the historical PL features from the program record and the CD features of the most similar TV program;

by applying the program records and the synthetic program records as input and the historical VR metrics of the program records as ground-truths, training a machine-learning (ML) model to predict audience performance metrics of the TV programs of the program records; and configuring the ML model for predicting audience performance metrics of one or more runtime program records respectively associated with hypothetical TV programs not yet available for viewing and/or not yet transmitted.

2. The system of claim 1, wherein the operations further include:

receiving a runtime simulated program record comprising an identifier of a planned and/or proposed new TV program, the CD features from the program records, and planned and/or proposed PL features;

applying the ML model to the runtime simulated program record to predict VR metrics for the new TV program; and providing the predicted VR metrics for the new TV program as output to a user interface.

3. The system of claim 2, wherein the operations further include, prior to receiving the runtime simulated program record:

at the user interface, receiving user input comprising data corresponding to: (i) the identifier of the new TV program, (ii) an identifier of an existing TV program in the database, and (iii) prospective PL data comprising a planned and/or proposed content-delivery platform and a planned and/or proposed delivery mode and RSDP for projected use by the planned and/or proposed content-delivery platform for the TV program;

identifying a runtime most similar TV program to the existing TV program based on a comparison of CD features of the existing TV program with those of the other TV programs in the database;

creating the runtime simulated program record comprising the planned and/or proposed PL features derived from the prospective PL data; and aggregating the CD features from the runtime most similar TV program into the runtime simulated program record.

4. The system of claim 3, wherein the historical PL features further comprise historically-applied ratings-prediction conditioning data, including viewer demographics and viewing timeline windows within which historical VR metrics were determined, and wherein the prospective PL data further comprise prospective ratings-prediction conditioning data, including prospective viewer demographics and viewing timeline windows within which VR metrics are to be predicted by the trained ML model.

5. The system of claim 2, wherein the operations further include: prior to training the ML model, determining a priority subset of total features of all available features of each program record that are priority features for use in model predictions, wherein training the ML model further comprises using the priority subset to cause training of the ML model to use only the priority features of the program records and the synthetic program records, and wherein applying the trained ML model to the runtime simulated program record comprises using the priority subset to cause the trained ML model to be applied only to the priority features of the simulated program record.

6. The system of claim 3, wherein the delivery mode of each TV program of the TV programs is at least one of: linear, wherein availability for viewing corresponds to broadcast transmission of the any TV program, or streaming, wherein availability for viewing corresponds to available for streaming upon viewer request, and wherein the RSDP for the TV program specifies at least one of: a drop date when the TV program became or will become available for viewing, a number of episodes of the TV program that became or will become available for viewing at the drop date, or a schedule of availability of episodes of the TV program beginning at the drop date.

7. The system of claim 1, wherein the operations further include:

receiving a runtime modified program record comprising an existing program record having historical PL features replaced with runtime PL features provided as user input via a user interface;

applying the ML model to the runtime modified program record to predict VR metrics for the TV program identified in the existing program record; and providing the predicted VR metrics for the TV program identified in the existing program record as output to a user interface.

8. The system of claim 1, wherein the ML model comprises a natural gradient boost (NG-boost) algorithm, wherein training the ML model comprises generating model objects, and wherein configuring the trained ML model for predicting audience performance metrics of the one or more runtime program records comprises providing the model objects for application to the one or more runtime program records.

9. The system of claim 1, wherein the operations further include aggregating the program records and the synthetic program records into an input data table, wherein each row comprises program records, and each column corresponds to a feature of the program records, and wherein the synthetic records are appended as rows at the end of the input data table.

10. The system of claim 1, wherein the statistical quantification of viewing performance of the TV program among one or more audience categories comprises total number of minutes of the TV program watched, aggregated for each of one or more viewer demographics.

11. A method carried out by a computing system having access to a database comprising program records each identifying a television (TV) program and including historical presentation-logistics (PL) features, content-descriptor (CD) features, and historical viewer-rating (VR) metrics, wherein the historical PL features comprise information identifying a content-delivery platform that previously sourced the TV program for end-user viewing and specifying a delivery mode used to deliver the TV program, and a release-schedule drop pattern (RSDP) that was used by the content-delivery platform for viewing availability and/or delivery, wherein the CD features characterize the TV program, and wherein the historical VR metrics comprise, for the historical PL features, statistical quantification of viewing performance of the TV program among one or more audience categories, wherein the method comprises:

for each of the program records, identifying from among the program records a most similar TV program based on a quantitative comparison of the CD features of the program record with those of the other program records, wherein the most similar TV program is different from the program of the program record;

for each of the program records, creating a synthetic program record comprising the historical PL features from the program record and the CD features of the most similar TV program;

by applying the program records and the synthetic program records as input and the historical VR metrics of the program records as ground-truths, training a machine-learning (ML) model to predict audience performance metrics of the TV programs of the program records; and configuring the ML model for predicting audience performance metrics of one or more runtime program records respectively associated with hypothetical TV programs not yet available for viewing and/or not yet transmitted.

12. The method of claim 11, further comprising:

receiving a runtime simulated program record comprising an identifier of a planned and/or proposed new TV program, the CD features from the program records, and planned and/or proposed PL features;

applying the ML model to the runtime simulated program record to predict VR metrics for the new TV program; and providing the predicted VR metrics for the new TV program as output to a user interface.

13. The method of claim 12, further comprising, prior to receiving a runtime simulated program record:

at the user interface, receiving user input comprising data corresponding to: (i) the identifier of the new TV program, (ii) an identifier of an existing TV program in the database, and (iii) prospective PL data comprising a planned and/or proposed content-delivery platform and a planned and/or proposed delivery mode and RSDP for projected use by the planned and/or proposed content-delivery platform for the TV program;

identifying a runtime most similar TV program to the existing TV program based on a comparison of CD features of the existing TV program with those of the other TV programs in the database;

creating the runtime simulated program record comprising the planned and/or proposed PL features derived from the prospective PL data; and aggregating the CD features from the runtime most similar TV program into the runtime simulated program record.

14. The method of claim 13, wherein the historical PL features further comprise historically-applied ratings-prediction conditioning data, including viewer demographics and viewing timeline windows within which historical VR metrics were determined, and wherein the prospective PL data further comprise prospective ratings-prediction conditioning data, including prospective viewer demographics and viewing timeline windows within which VR metrics are to be predicted by the trained ML model.

15. The method of claim 13, wherein the delivery mode of each TV program of the TV programs is at least one of: linear, wherein availability for viewing corresponds to broadcast transmission of the any TV program, or streaming, wherein availability for viewing corresponds to available for streaming upon viewer request, and wherein the RSDP for the TV program specifies at least one of: a drop date when the TV program became or will become available for viewing, a number of episodes of the TV program that became or will become available for viewing at the drop date, or a schedule of availability of episodes of the TV program beginning at the drop date.

16. The method of claim 11, further comprising:

receiving a runtime modified program record comprising an existing program record having historical PL features replaced with runtime PL features provided as user input via a user interface;

applying the ML model to the runtime modified program record to predict VR metrics for the TV program identified in the existing program record; and providing the predicted VR metrics for the TV program identified in the existing program record as output to a user interface.

17. The method of claim 11, wherein the ML model comprises a natural gradient boost (NG-boost) algorithm, wherein training the ML model comprises generating model objects, and wherein configuring the trained ML model for predicting audience performance metrics of the one or more runtime program records comprises providing the model objects for application to the one or more runtime program records.

18. The method of claim 11, further comprising aggregating the program records and the synthetic program records into an input data table, wherein each row comprises program records, and each column corresponds to a feature of the program records, and wherein the synthetic records are appended as rows at the end of the input data table.

19. The method of claim 11, wherein the statistical quantification of viewing performance of the TV program among one or more audience categories comprises total number of minutes of the TV program watched, aggregated for each of one or more viewer demographics.

20. A non-transitory computer-readable medium having instructions stored thereon that, when carried out by one or more processors of a computing system comprising a database comprising program records each identifying a television (TV) program and including historical presentation-logistics (PL) features, content-descriptor (CD) features, and historical viewer-rating (VR) metrics, wherein the historical PL features comprise information identifying a content-delivery platform that previously sourced the TV program for end-user viewing and specifying a delivery mode used to deliver the TV program, and a release-schedule drop pattern (RSDP) that was used by the content-delivery platform for viewing availability and/or delivery, wherein the CD features characterize the TV program, and wherein the historical VR metrics comprise, for the historical PL features, statistical quantification of viewing performance of the TV program among one or more audience categories, cause the computing system to carry out operations including:

for each of the program records, identifying from among the program records a most similar TV program based on a quantitative comparison of the CD features of the program record with those of the other program records, wherein the most similar TV program is different from the program of the program record;

for each of the program records, creating a synthetic program record comprising the historical PL features from the program record and the CD features of the most similar TV program;

by applying the program records and the synthetic program records as input and the historical VR metrics of the program records as ground-truths, training a machine-learning (ML) model to predict audience performance metrics of the TV programs of the program records; and configuring the ML model for predicting audience performance metrics of one or more runtime program records respectively associated with hypothetical TV programs not yet available for viewing and/or not yet transmitted.

* * * * *